United States Patent
Okagaki et al.

(10) Patent No.: US 7,130,656 B2
(45) Date of Patent: Oct. 31, 2006

(54) AUTOMOTIVE INFORMATION SYSTEM AND METHOD OF CONTROLLING THE SAME, RECORDING MEDIUM STORING CONTROL PROGRAM, DISK PLAYBACK APPARATUS, AND SEMICONDUCTOR INTEGRATED CIRCUIT

(75) Inventors: Hiroyuki Okagaki, Tokyo (JP); Sadafumi Hamashima, Tokyo (JP); Satoru Kanazawa, Tokyo (JP); Nobuhiro Kurihara, Tokyo (JP)

(73) Assignee: Clarion Co., Ltd., Saitame-ken (JP)

( * ) Notice: Subject to any disclaimer, the term of this patent is extended or adjusted under 35 U.S.C. 154(b) by 757 days.

(21) Appl. No.: 09/990,246

(22) Filed: Nov. 20, 2001

(65) Prior Publication Data
US 2002/0032876 A1   Mar. 14, 2002

Related U.S. Application Data

(62) Division of application No. 09/301,975, filed on Apr. 29, 1999, now abandoned.

(30) Foreign Application Priority Data

Apr. 30, 1998   (JP)   ................................. 10-120691
Apr. 30, 1998   (JP)   ................................. 10-121319

(51) Int. Cl.
    *H04B 1/38*   (2006.01)
    *H04M 1/00*   (2006.01)

(52) U.S. Cl. ................ 455/557; 455/556.1; 455/556.2; 455/563; 455/410; 455/412.2; 710/36; 710/724

(58) Field of Classification Search ................ 455/557, 455/556.1, 556.2, 563, 410, 412.2; 713/300; 710/36, 724
See application file for complete search history.

(56) References Cited

U.S. PATENT DOCUMENTS 4,821,309 A    4/1989    Namekawa
(Continued)

FOREIGN PATENT DOCUMENTS

EP            801192        10/1997
(Continued)

OTHER PUBLICATIONS

Elphick, M; "Building Bridges to 1394" Computer Design, Pennwell Publ. Littleton MA, US, vol. 36, No. 9, Sep. 1, 1997.

* cited by examiner

*Primary Examiner*—Marceau Milord

(57) ABSTRACT

An automotive information system has a main unit including a CPU and component units connected to the main unit through a universal serial BUS (USB), such as a car audio system including a CD-ROM auto-changer, a security control system, and a telephone system. At least one of the USB-connected component device, e.g., the security control system and/or the telephone system, has a detecting unit that detects occurrence of an event such as illegal approach to the automobile or receipt of telephone call. The USB-connected component device also has a start signal transmitting unit that transmits a start signal to the main unit when occurrence of the event is detected by the detecting unit. The main unit has a start signal receiving unit and a power control unit that serves turn on the power supply to the main unit in response to the start signal received by the start signal receiving unit. The main unit also has an inquiring unit which inquires the USB-connected component devices whether these component devices have sent the start signal. The USB-connected component device has an answering unit which answers the inquiry.

20 Claims, 14 Drawing Sheets

U.S. PATENT DOCUMENTS

| | | | |
|---|---|---|---|
| 4,891,650 A | | 1/1990 | Sheffer |
| 5,086,510 A | * | 2/1992 | Guenther et al. ........ 455/575.9 |
| 5,428,189 A | | 6/1995 | Dorner et al. |
| 5,673,305 A | | 9/1997 | Ross |
| 5,760,699 A | * | 6/1998 | Saka et al. ............. 340/825.21 |
| 5,778,312 A | * | 7/1998 | Kawashima ............. 455/343.5 |
| 5,870,355 A | * | 2/1999 | Fujihara .................. 369/30.26 |
| 5,878,353 A | * | 3/1999 | ul Azam et al. ............ 455/566 |
| 5,991,546 A | * | 11/1999 | Chan et al. ................... 710/62 |
| 6,006,285 A | * | 12/1999 | Jacobs et al. ................. 710/14 |
| 6,023,290 A | * | 2/2000 | Seita .......................... 348/118 |
| 6,031,825 A | * | 2/2000 | Kaikuranta et al. ......... 370/296 |
| 6,131,042 A | * | 10/2000 | Lee et al. ................. 455/556.1 |
| 6,199,122 B1 | * | 3/2001 | Kobayashi ................... 710/36 |
| 6,216,201 B1 | | 4/2001 | Ado et al. |
| 6,230,074 B1 | * | 5/2001 | Shinkai ...................... 700/214 |
| 6,330,334 B1 | * | 12/2001 | Ryan .......................... 380/237 |
| 6,529,835 B1 | * | 3/2003 | Wada et al. ................... 702/21 |
| 6,633,753 B1 | * | 10/2003 | Kido ....................... 455/343.2 |

FOREIGN PATENT DOCUMENTS

| | | |
|---|---|---|
| GB | 2264613 | 9/1993 |
| JP | 10106141 | 4/1998 |
| WO | WO 96/32783 | 10/1996 |
| WO | WO98/12867 | 3/1998 |

AUTOMOTIVE INFORMATION SYSTEM AND METHOD OF CONTROLLING THE SAME, RECORDING MEDIUM STORING CONTROL PROGRAM, DISK PLAYBACK APPARATUS, AND SEMICONDUCTOR INTEGRATED CIRCUIT

RELATED APPLICATIONS

This is a divisional application of U.S. Ser. No. 09/301,975, filed on Apr. 29, 1999 and now abandoned.

BACKGROUND OF THE INVENTION

1. Field of the Invention

The present invention relates to an automotive system which is composed of systems such as a car audio system and also to a method of controlling such an automotive information system, as well as to a storage medium that stores a control program. The present invention also is concerned with an information processing apparatus, an electronic device and a control unit that are suitable for use in the automotive information system. The present invention also pertains to a disk playback apparatus, as well as to a semiconductor integrated circuit, suitable for use in the automotive information system.

2. Description of the Related Arts

Car audio systems that are used on automobiles are known. Such a car audio system has a major function to provide audio information through a speaker mounted on the automobile, based on sound information acquired through a radio tuner, a cassette tape deck or a CD player. Current progress in the semiconductor technology has made it possible to combine with a car audio system various systems or apparatuses such as a car navigation system, a CD auto-changer or an MD auto-changer, cellular phone and so forth. In this specification, such a consolidated system will be referred to as "an automotive information system", while systems or apparatuses combined with a car audio system will be collectively referred to also as "peripheral devices".

Automotive information system of the kind described generally employs highly complicated wring layouts. For instance, a complicated wiring layout is necessary when a compatible auto-changer that is adapted both for music CDs and CD-ROMs is connected via cables to a main unit of the automotive information system that has a car audio function and car navigation function. The auto-changer reads sound data (audio data) from a music CD and reads also digital data such as car navigation program data and map data.

Hitherto, the connection between the main unit of the automotive information system and the auto-changer required. besides an electric power cable and control cables, an analog cable corresponding to a LINE-OUT terminal and an optical fiber for digital output that are used for transmission of audio data acquired from a music CD, as well as a digital signal cable which is used exclusively for digital data read from a CD-ROM and which is adapted to, for example, an ATAPI interface.

Despite the sophisticated and complicated wiring layout, the audio function and car navigation function of the known automotive information system are available only on an automobile and, therefore, have limited use.

Automotive information systems are also known of the type that has a microcomputer incorporated in the main unit of the system or in each of the devices constituting the system. Such microcomputers, however, are of a low grade that is intended only for controlling mechanical motions of the system or controlling display of characters. It is impossible to add new functions or modify existing functions on such microcomputers. In addition, control of supply of electrical power is possible only from the main unit to which cables and lines are concentrated. Namely, although supply of electrical power to peripheral devices is controllable from the main unit, no function is available for enabling one or more peripheral devices to turn on and off the power supply to the main unit of the system.

SUMMARY OF THE INVENTION

Accordingly, it is a primary object of the present invention to provide an automotive information system having a simplified wiring layout and having a function to enable a peripheral device of the automotive information system to start the main unit of the system.

It is also an object of the present invention to provide an automotive information system having enhanced anti-theft or security effect.

It is also an object of the present invention to provide an automotive information system in which audio data read from a disk is output as digital data of the same form as other digital data that are dealt with in the automotive information system.

To these ends, according to the present invention, there is provided an automotive information system, comprising: a main unit having means for detecting a start signal, and means for turning on a power supply to the main unit in response to the start signal; and at least one device connected to the main unit and having means for detecting that a predetermined condition has been satisfied, and means for sending the start signal to the main unit.

The invention also provides a method of controlling an automotive information system having a main unit and at least one device connected to the main unit, the method comprising the steps of: enabling the device to detect that a predetermined condition has been satisfied; causing the device to send a start signal to the main unit when the satisfaction of the predetermined condition is detected; causing the main unit to detect the start signal; and enabling the main unit to turn on power supply to the main unit in response to the start signal.

With these features, it is possible to turn on the power supply to the main unit of the automotive information system simply by sending a start signal from one of the devices constituting the system. Thus, the automotive information system can have a wider use by incorporating a system such as a telephone system and/or a security system. For instance, the power supply to the main unit of the automotive system that has been turned off can be turned on when a call is received by the telephone unit connected to the main unit, so that the system becomes alive to enable hand-free telephone conversation by means of a speaker and a microphone, with the aid of an amplifier incorporated in the main unit. Similarly, the power supply to the main unit can be turned on in response to a signal received from a security control system informing of occurrence of an extraordinary event, so that the automotive information system wakes up to inform the user of the occurrence of the extraordinary event through the functioning of the telephone system.

In accordance with the present invention, there is provided also an information processing apparatus, comprising a main unit and at least one device connected to the main unit, wherein the device includes: means for detecting that a predetermined condition has been satisfied; and means for sending a start signal to the main unit upon detection of satisfaction of the predetermined condition; and wherein the main unit includes: means for detecting the start signal; means for turning on power supply to the main unit in response to the start signal; and means for inquiring, when the power supply is turned on in response to the start signal, the device whether the device has sent the start signal; and wherein the device includes means for answering the inquiry.

With these features, the main unit can identify the source of the start signal, i.e., from which one of the devices the start signal has been received. It is therefore not necessary to employ independent start signal lines for the respective devices.

The present invention also provides an automotive information system cable for connecting main unit of an automotive information system and a device included in the automotive information system, comprising: a first power line that enables electrical power to be supplied from the main unit to the device when the power supply to the main unit has been turned on; a data line for enabling exchange of data between the main part and the device; a second power line for enabling backup power to the device at least when the power supply to the main unit has not been turned on; and a signal line for transmitting a start signal from the device to the main unit.

In accordance with these features, the main unit cannot be supplied with electrical power through the first power line when the power supply has been turned off, but can be supplied with electrical power through the second power line from a backup power supply on an automobile. It is therefore possible to send the start signal to the main unit via the signal line, under the assist of the backup power supplied through the second power line. Thus, addition of the second power line and the signal line to a cable such as a USB (Universal Serial BUS) enables exchange of various kinds of data between the main unit and the devices, without requiring provision of an independent power cable for supplying power to the main unit when the power supply has been turned off and without necessitating any signal cable for transmitting the start signal.

The present invention also provides an automotive information system comprising a main unit, and a security control unit and a wireless telephone unit that are connected to the main unit, wherein the security control unit includes: a sensor for sensing an extraordinary event; and means for sending a start signal to the main unit; wherein the main unit includes: means for detecting the start signal; means operative to turn on power supply to the main unit in response to the start signal; and means for sending, when the power supply is turned on in response to the start signal received from the security control unit, a notification request signal to the wireless telephone unit to request the wireless telephone unit to send a notification of occurrence of the extraordinary event; and wherein the wireless telephone unit includes: means for detecting the notification request signal; and means for activating the telephone function of the wireless telephone unit in response to the notification request signal to notify a user of the occurrence of the extraordinary event.

Provided also is a method of controlling an automotive information system having a main unit, and a security control unit and a wireless telephone unit that are connected to the main unit, the method comprising the steps of: enabling the security control unit to sense an extraordinary event; causing, when the extraordinary event is sensed, the security control system to send a start signal to the main unit; enabling the main unit to detect the start signal; enabling the main unit to turn on power supply to the main unit in response to the start signal; causing, when the power supply is turned on in response to the start signal received from the security control unit, the main unit to send a notification request signal to the wireless telephone unit to request the wireless telephone unit to send a notification of occurrence of the extraordinary event; causing the wireless telephone unit to detect the notification request signal; and activating a telephone function of the wireless telephone unit in response to the notification request signal to notify a user of the occurrence of the extraordinary event.

In accordance with these features, the power supply to the main unit is turned on when an extraordinary event is detected by the security control unit, so that the main unit causes the wireless telephone unit to inform the user of the occurrence of the extraordinary event. Upon receipt of the information, the user can make haste to the place where the automobile is parked. It is thus possible to achieve higher anti-theft or security effect than that offered by mere activation of a siren or the like.

The automotive information system of the invention also permits hand-free telephone conversation. To this end, the present invention provides an automotive system comprising a main unit, a wireless telephone unit connected to the main unit, a speaker, and a microphone; wherein the wireless telephone unit includes: means for detecting receipt of a telephone call; and means for sending a start signal to the main unit upon detection of the receipt of the telephone call; wherein the main unit includes: means for detecting the start signal; means for turning on power supply to the main unit in response to the start signal; means for informing a user of the receipt of the telephone call when the power supply to the main unit is turned on in response to the start signal received from the wireless telephone unit; means for detecting a responding operation of the user for responding to the telephone call; and means for sending, when the responding operation is detected, connecting instruction to the wireless telephone unit to request the wireless telephone unit to connect the telephone call to the main unit; wherein the wireless telephone unit further includes: means for detecting the connecting instruction; and means responsive to the connecting instruction, for connecting the telephone call to the main unit; and wherein the main unit further includes means for enabling the user to communicate with the telephone caller by means of the speaker and the microphone.

The invention also provides a method of controlling an automotive system having a main unit, a wireless telephone unit connected to the main unit, a speaker, and a microphone, the method comprising the steps of: enabling the wireless telephone unit to detect receipt of a telephone call; causing the wireless telephone unit to send a start signal to the main unit upon detection of the receipt of the telephone call; enabling the main unit to detect the start signal; enabling the main unit to turn on power supply to the main unit in response to the start signal; enabling the main unit to inform a user of the receipt of the telephone call when the power supply to the main unit is turned on in response to the start signal received from the wireless telephone unit; enabling the main unit to detect a responding operation of the user for responding to the telephone call; causing the main unit to send connecting instruction to the wireless telephone unit to request the wireless telephone unit to connect the telephone call to the main unit; causing the wireless telephone unit to detect the connecting instruction; and causing the wireless telephone unit to connect the telephone call to the main unit in response to the connecting instruction; and causing the main unit to enable the user to communicate with the telephone caller by means of the speaker and the microphone.

In accordance with these features, when telephone call is received by the automotive telephone, e.g., a cellular phone, the power supply to the main unit is turned on to activate the automotive information system. When the user wishes to be connected to the call, he conducts a predetermined operation which automatically triggers the telephone unit to connect the telephone call to the user, whereby hand-free telephone conversation is conducted by using the speaker and the microphone, with the aid of an amplifier incorporated in the automotive information system.

The present invention also provides an electronic device which is incorporated in the automotive information system and which can start the main unit of the system. Thus, the present invention provides an electronic device to be connected to a control unit of an automotive information system, comprising: means for detecting that a predetermined condition has been satisfied; means for sending a start signal to the control unit upon detection of satisfaction of the predetermined condition; and means for answering an inquiry given by the control unit as to whether the electronic device has sent the start signal.

The present invention also provides a control unit that constitutes the main unit of an automotive information system and that can be started up by a device which is one of the constituent devices of the automotive information system. Thus, the present invention provides an automotive information system control unit implementing an automotive information system in cooperation with at least one electronic device connected thereto, the automotive information system control unit comprising: means for detecting a start signal sent from the electronic device; means for turning on power supply to the main unit upon detection of the start signal; and means for inquiring, when the power supply is turned on in response to the start signal, the electronic device whether the electronic device has sent the start signal.

With these features, it is possible to implement an automotive information system by assembling together electronic devices and control unit selected from among various types of electronic devices and control units, thus offering a greater degree of freedom in the configuration of the automotive information system.

In accordance with another aspect of the present invention, there is provided a disk playback apparatus according to the present invention comprises means for reading audio data and digital data from recording mediums, and a decoder for converting both the read audio data and digital data into output data in the same protocol format.

A disk playback method of the present invention is implemented in the disk playback apparatus of the present invention, and comprises the steps of reading audio data and digital data from recording mediums, and converting both the read audio data and digital data into output data in the same protocol format.

With the above features, when any of audio data and digital data is read from a recording medium, the read data is converted into the same protocol format. Therefore, the whole or a part of processing of the audio data and the digital data can be realized with the same procedure and configuration.

In the disk playback apparatus, preferably, the audio data is read from a musical CD, and the digital data is read from a CD-ROM.

With the above features, a disk playback apparatus of the so-called compatible type reading audio data from a musical CD and digital data from a CD-ROM can be used to perform both playback of music and digital information processing required in car navigation, etc.

In the disk playback apparatus, preferably, the decoder converts both the audio data and the digital data into output data in the ATAPI format.

Also, in the disk playback method, preferably, the converting step converts both the audio data and the digital data into output data in the ATAPI format.

With the above features, the disk playback apparatus produces output data in the ATAPI format. Any of the audio data read from a musical CD and the digital data read from a CD-ROM can be therefore easily processed with the same IDE interface through communication using a command packet similarly to a SCSI.

The disk playback apparatus, preferably, further comprises a controller for outputting both the output data converted from the audio data and the output data converted from the digital data in the same interface format.

Also, the disk playback method, preferably, further comprises a step of outputting both the output data converted from the audio data and the output data converted from the digital data in the same interface format.

With the above features, the output data converted from the audio data and the output data converted from the digital data are both outputted in the same interface format. Accordingly, both the output data can be transmitted through the same cable.

The disk playback apparatus, preferably, further comprises a controller for outputting both the output data converted from the audio data and the output data converted from the digital data through the same daisy chain line.

With the above features, since a plurality of units including the disk playback apparatus are connected one after another through a daisy chain line, an automotive information system having simpler wiring can be easily constructed.

In the disk playback apparatus, preferably, the daisy chain line comprises a universal serial bus.

With the above features, since a universal serial bus (USB) is employed as the daisy chain line, a number of various units can be easily connected.

In the disk playback apparatus, preferably, the controller sends the output data converted from the audio data by isochronous transfer.

With the above features, the transfer capacity of the daisy chain line is not affected by the availability factor of a bus unlike the case of using bulk transfer. Since the constant transfer capacity and transfer timing are always ensured, a plurality of units can transfer successive data simultaneously.

In the disk playback apparatus, preferably, the controller sends the output data converted from the digital data by bulk transfer.

With the above features, bulk transfer is employed to send digital data which does not require it to be ensured that a certain amount of data is transferred for a certain period of time. The bulk transfer provides much higher quality of transferred data than the isochronous transfer because error correction and retransmission of data are made in the bulk transfer if there occurs an error in data transfer.

The disk playback apparatus, preferably, further comprises control means for transferring the output data converted by the decoder to the controller.

Also, the disk playback method, preferably, further comprises a step of transferring the output data converted by the converting step to the outputting step with at least one of direct memory access and parallel bit-number conversion.

With the above features, the control means changes the bit width of data transferred, and controls the direct memory access (DMA) transfer. It is therefore possible to achieve increased flexibility of unit combinations and smooth data transfer between the decoder and the controller.

In the disk playback apparatus, preferably, the control means controls direct memory access.

With the above features, since data read from a disk is transferred at a high speed using DMA, even audio data read from a medium having a large amount of data and high sound quality, such as a musical CD, can also be easily processed.

In the disk playback apparatus, preferably, the control means converts the number of bits that is a unit of the output data transferred from the decoder to the controller.

With the above features, the number of bits is converted which is a unit of the output data transferred from the decoder to the controller. Therefore, a decoder and a controller employing different numbers of bits as respective units in processing, e.g., an ATAPI decoder employing 16 bits and a USB controller employing 8 bits, can be used in a combined manner.

The disk playback apparatus, preferably, further comprises a ROM storing a program to control the controller, and an address latch for accessing the ROM from the controller.

With the above features, by the operation of the address latch, a part of an address bus used for accessing the ROM from the controller can serve also as a data bus. Supposing, for example, that the controller outputs data having an address designated by 16 bits, i.e., bits 0–15, and the ROM sends back data of 8 bits, the data of 8 bits read from the ROM can be received by the ports of the controller which have been used for outputting the data, by holding the bits 8–15 of the address bus in the latch.

These and other objects, features and advantages of the present invention will become clear from the following description when the same is read in conjunction with the accompanying drawings.

DESCRIPTION OF THE PREFERRED EMBODIMENTS

A first embodiment of the present invention will now be described with specific reference to FIGS. 1 to 9.

The embodiment is implemented by combining various hardware architectures and a computer which operates under the control of software. Various kinds of software to be used for controlling the computer are formed by combining various kinds of commands which are described in this specification. The term "software" includes not only the program codes but also data to be relied upon when the program codes are executed. The software thus formed achieves the advantage offered by the present invention, by making effective use of not only various kinds of audio devices incorporated in the automotive information system but also of physical processing devices such as a CPU and various kinds of chip sets.

The hardware and the software implementing the present invention can have a wide variety. For instance, a certain function may be implemented either by a physical electronic circuit such as an LSI or by software, depending on factors such as the overall circuit configuration and processing performance of the CPU. A variety of types of software can be used, such as compiler, assembler, microprogram, and so forth. When the software or program for implementing the present invention is stored in a storage medium, such a storage medium by itself provides an aspect of the present invention.

Thus, the present invention can be implemented in various forms by using a computer. The following description of the embodiment, therefore, proceeds by making reference to the drawings showing imaginary circuit blocks that implement functions employed in the invention.

1. Configuration 1-1. Overall Configuration

The automotive information system of the first embodiment has a main unit which conducts overall control of the whole system and a plurality of component devices or units connected to the main unit. The first embodiment features a function for enabling one or more component units to start the main unit by turning on a power supply to the main unit. A description will be given first of the component units connected to the main unit 1, with reference to FIG. 1 which shows function blocks employed in the automotive information system.

Figure 1:
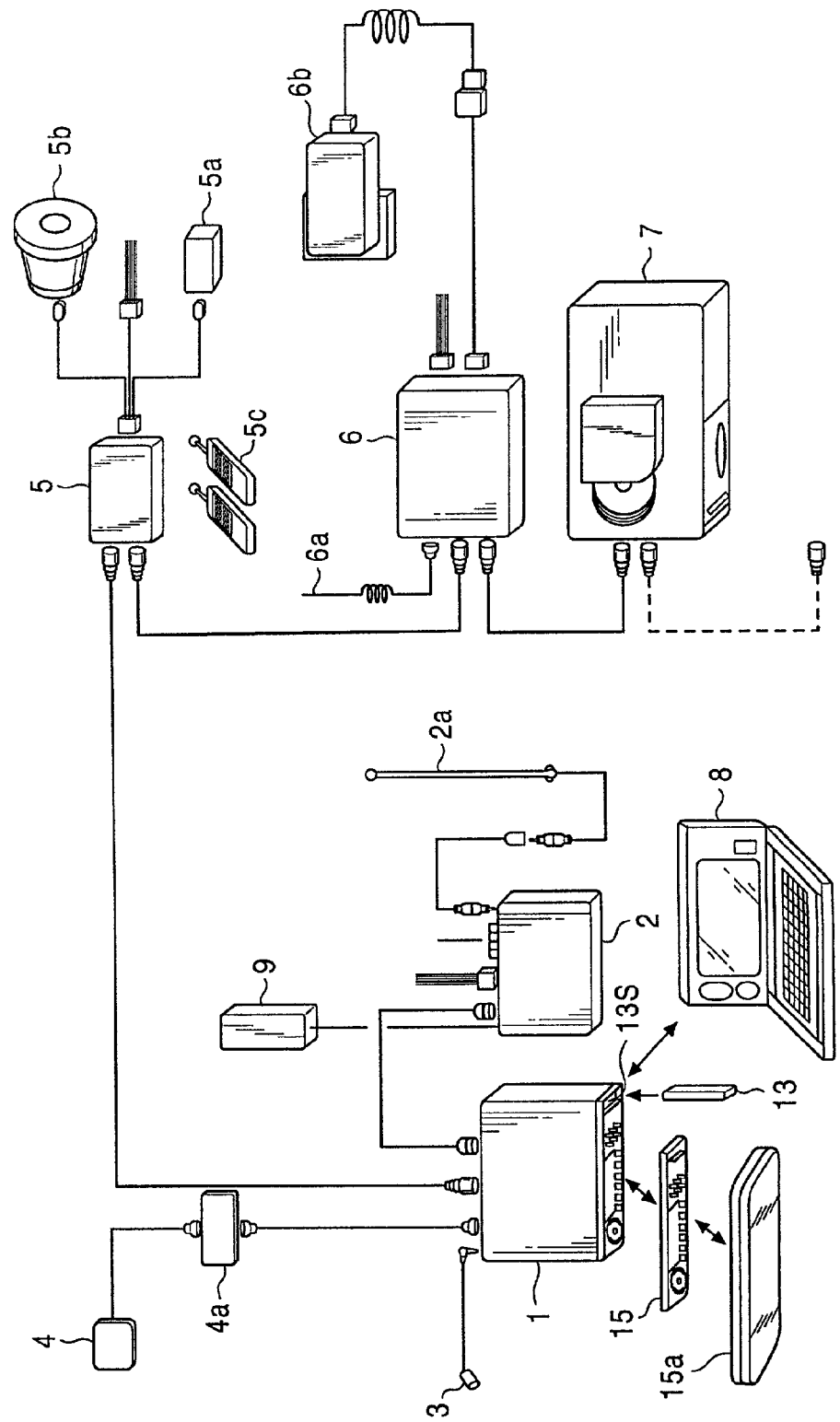
FIG. 1 is a block diagram showing the overall configuration of an automotive information system embodying the present invention.

Referring first to FIG. 1 showing the overall configuration of the embodiment, the automotive information system has a main unit 1 and various information devices including a tuner amplifier unit 2, a microphone 3, a GPS antenna 4, a security control unit 5, a telephone unit 6, a CD-ROM auto-changer 7, and an auxiliary battery 9 serving as a backup power.

The main unit 1 incorporates a controlling computer that performs overall control of the whole system, thus serving as a control unit. The tuner amplifier unit 2 includes an AM/FM antenna 2a and, although not shown, a radio tuner and an amplifier for activating a speaker. The microphone 3 is used to input user's voice for the purpose of voice recognition which is implemented by a program in the computer.

The tuner amplifier unit 2, microphone 3, GPS antenna 4, security control unit 5, telephone unit (automotive mobile phone) 6, and the CD-ROM auto-changer 7 serve as electronic devices that are connected to the main unit 1 and that provide at least one of audio data and digital data.

Figure 2:
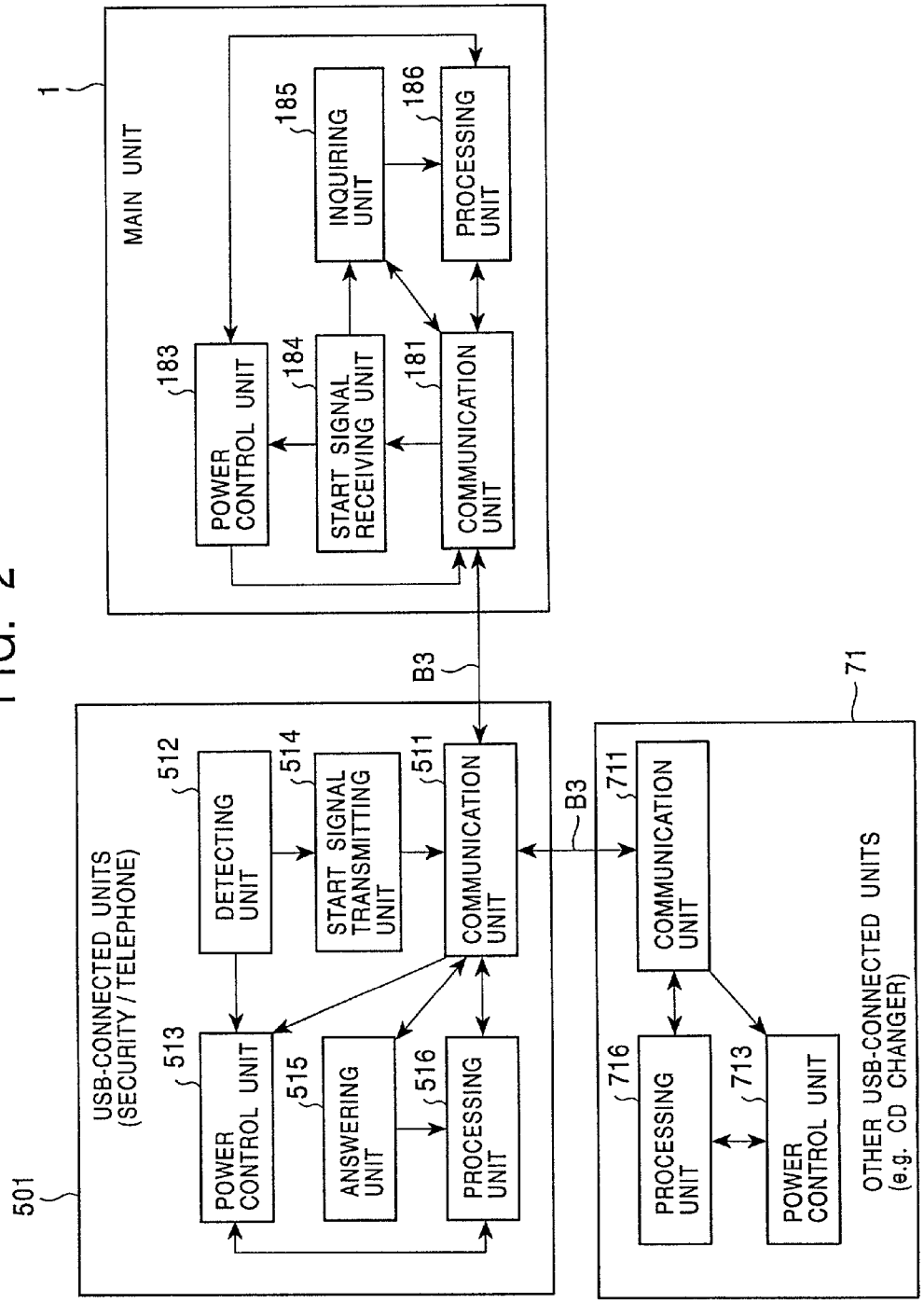
FIG. 2 is a block diagram showing a function for turning on power supply to a main unit of the automotive information system by a start signal given by a component device of the system.

A description will be given of a concept of the function for enabling one or more of the component electronic devices to turn on the power supply to the main unit, with specific reference to FIG. 2. Referring to this Figure, units 501 and 71 are connected to the main unit 1 in a daisy-chain fashion like a potato vine, via a USB cable B3. The units 501 and 71 will be referred to as "USB-connected devices or units", as they are connected to the main unit 1 by means of the USB cable.

Each of the main unit 1, USB-connected unit 501 and the USB-connected unit 71 has hardware such as electronic circuits and a controlling computer. Each block such as a communication unit 511 which is a component of the USB-connected unit corresponds to each of the functions to be incorporated in the main unit 1, the USB-connected unit 501 or the USB-connected unit 71. In actual circuitry, however, these function blocks are implemented by cooperation between hardware and a computer which is under the control of software.

The USB-connected unit 501 and the USB-connected unit 71 have different configurations. More specifically, the USB-connected unit 501 represents functions which are common to the security control unit 5 and the telephone unit 6 that are shown in FIG. 1 and that are can turn on the power supply to the main unit 1. In contrast, the USB-connected unit 71 corresponds to the CD-ROM auto-changer 7 shown in FIG. 1 and has no function to turn on the power supply to the main unit 1.

More specifically, the USB-connected unit 501 includes a communication unit 511, a detecting unit 512, a power controlling unit 513, a start signal transmitting unit 514, an answering unit 515 and a processing unit 516. Meanwhile, the USB-connected unit 71 has a communication unit 711, a power control unit 713 and a processing unit 716, but is devoid of any unit which would correspond to the detecting unit, start signal transmitting unit and the answering unit that are incorporated in the USB-connected unit 501. The main unit 1 has a communication unit 181, a start signal receiving unit 184, a power control unit 183 and an inquiring section 185.

The communication units 511, 181 and 711 are capable of communicating with one another through a cable B3. The detecting unit 512 of the USB-connected unit 501 serve as means for detecting that a predetermined condition for starting up the main unit 1 has been satisfied. The start signal transmitting unit 514 of the USB-connected unit 501 serves as means for sending a start signal to the main unit 1 when the detecting unit 512 has detected that the predetermined condition has been met.

The start signal receiving unit 184 of the main unit 1 constitutes means for detecting the start signal that is transmitted from the USB-connected unit 501 via the cable B3. The power control unit 183 of the main unit 1 serves as means for turning on the power supply to the main unit 1 in response to the start signal detected by the start signal receiving unit 184. Thus, the power control unit 183 is operative to selectively turn on and off the power supply to the main unit 1 and also to send a control signal to each of the power control units 513 and 713 via the cable B3 so as to turn on and off the power supply to each of the USB-connected units 501 and 71.

When the power supply to the main unit 1 is turned on in response to the start signal, the inquiring unit 185 of the main unit 1 sends an inquiry to each of the USB-connected units 501 and 71, asking whether the unit 501 or the unit 71 has sent the above-mentioned start signal. The answering unit 515 gives an answer to this inquiry given by the main unit 1.

The processing units 516, 716 and 186 conduct processings peculiar to the USB-connected unit 501, the USB-connected unit 71 and the main unit 1, such as the processings for executing receipt and transmission of telephone call, playback of a CD and overall control of the system, while exchanging data with other units through their communication units. The power control unit 513 and the power control unit 713 respectively control the power supply to the USB-connected unit 501 and the USB-connected unit 71, in accordance with the state of the power transmitted from the main unit 1 through the cable B3 and in accordance with the contents of control signals which also are transmitted from the main unit 1 through the cable B3.

1-1-1 Daisy-chain Connection

As explained before in connection with FIG. 2, the USB-connected unit 501 represents the security control unit 5 and the telephone unit 6. As will be clear from FIG. 2, as well as from FIG. 1, the security control unit 5 and the telephone unit 6 are connected to the main unit 1 through the cable B3 which is a USB (Universal Serial Bus). It is to be noted that the USB used in this embodiment is not the same as conventional USB but is an automotive information system cable which incorporates the following novel features in addition to the features of the known USB. It is also to be understood that the USB is a serial BUS which interconnects a plurality of devices or units in a daisy-chain fashion.

More specifically, a conventional USB has a single power line (+5V), data lines (DATA+, DATA−) and a ground GND. The power line serves to transmit electrical power to each device or unit from the main unit 1 when the power supply to the main unit 1 is on. This power line will be therefore referred to as a "first power line", hereinafter.

The USB employed in this embodiment, i.e., the automotive information system cable, has a second power line, a signal line for transmitting a start signal from each of the security control unit 5 and the telephone unit 6 to the main unit 1 (this signal line will be referred to as "wakeup", hereinafter), a reserved line and an additional ground GND. The second power line is adapted for supplying backup electrical power to each device or unit from, for example, a backup battery (14 V) of the automobile, at least when the power supply to the main unit 1 has not been turned on.

Thus, when the power supply to the main unit 1 is off, supply of electrical power to the devices or units through the first power line is not conducted but the devices or units are supplied with backup electrical power from the backup power supply of the automobile through the second power line. It is therefore possible to send a start signal to the main unit 1 from one or more of the devices or units through the signal line Wake Up, by using the backup power supplied to the devices or units.

In this embodiment, each of the devices or units that are connected through the cable B3 is adapted to transmit and receive data to and from other device in a protocol form that conforms with the USB. For example, the arrangement is as follows. The CD-ROM auto-changer 7 has upstream and downstream hubs. In the CD-ROM auto-changer 7, digital data is read from a music CD or a CD-ROM in an ATAPI fashion (parallel form). The data thus read is then converted into a serial form that conforms with the USB protocol form and is delivered to the USB.

Thus, the security unit 5, telephone unit 6 and the CDROM auto-changer 7 are serially connected. This makes it easy to locate these units 5, 6 and 7 at positions remote from one another as required. Although in FIG. 1 the security unit 5, telephone unit 6 and the auto-changer 7 are connected serially in the mentioned order, this is only illustrative and the order of connection may be changed as required. Likewise, it is not essential that all these three units 5, 6 and 7 are connected: namely, one of them may be excluded from the serial connection.

1-1-2. CD-ROM Auto-changer

The CD-ROM auto-changer 7 automatically performs change-over of a plurality of music CDs and CD-ROMs from one to another, and reads audio data and digital data from a music CD and from a CD-ROM, respectively, in accordance with commands received through the USB line. The CD-ROM auto-changer 7 then sends the read data through the USB line.

The term "audio data" is used in this specification to mean data representing sound information such as a music, whereas the term "digital data" is used to mean data which are inherently in the digital form such as character codes and numerical values, other than the audio data.

The disk payback apparatus reads audio data and digital data from storage media such as music CDs or CD-ROMs. Thus, the storage media handled by the disk playback apparatus are mainly music CDs that store audio data and CD-ROMs storing digital data. In this specification, the term "playback" refers both to reading, i.e., reproduction, of audio data from music CDs and reading, i.e., reproduction, of digital data from the CD-ROMs.

The CD-ROM auto-changer 7 reads audio data audio data from a music CD and digital data from a CD-ROM. These two types of read data are both converted into output data of an identical protocol form, i.e., ATAPI form, and such output data are sent to the main unit 1 in an isochronous manner, through an identical interface form, i.e., the USB.

1-1-3. Main Unit

As will be seen from FIG. 1, the main unit 1 has a slot 13S for receiving a compact flash card 13, and a detachable face plate unit 15. The compact flash card 13 is a storage medium employing a flash memory, and is capable of reading and writing data from and into the main unit 1 when received in the slot 13S. The compact flash card 13 is used for the purpose of exchanging data and programs between the computer of the main unit 1 and other external computers, as well as for the purpose of backing up various data set on the automotive information system.

The illustrated embodiment does not exclude the use of extension cards having various functions, such as a drive card, a MODEM card, various interface cards and so forth, besides the compact flash card 13 specifically mentioned above, provided that these extension cards meet the form of PCMCIA (Personal Computer Memory Card International Association).

The detachable face plate unit 15 has a display section which visually presents various kinds of information to the user, and an operating section including keys to be operated by the user. The face plate unit 15 may be a large-sized color LCD (Liquid Crystal Display), e.g., 256 dots in horizontal direction and 64 dots in vertical direction.

The user can detach the face plate unit 15 and carry it with him when leaving the automobile. This produces an anti-theft effect. Namely, any person who wish to steal the car audio system or other devices of the information system will despair of stealing when he understands that the device without the display and operating section has no commercial value. It is advisable that a suitable case 15a for accommodating the detached face plate unit 15 is prepared so as to prevent damaging of the unit 15 itself or other objects which may happen to be collided by the unit 15 when the user carries the unit 15 with him.

An infrared communication unit is incorporated in the face plate unit 15. The infrared communication unit permits exchange of data between the face plate unit 15 and a separate handheld PC 8.

1-1-2 Other Devices and Units

The GPS antenna 4 (see FIG. 1) receives radio waves from GPS satellites. Signals caught by the GPS antenna 4 is supplied to a GPS unit in the main unit 1 via a GPS receiver unit 4a. The GPS unit, which is not shown FIG. 1, computes the position of the GPS unit on the globe, based on the radio waves. The computer of the main unit 1 implements functions of car navigation system based on programs. The results of the position computation are delivered to a car navigation system function.

The security control unit 5 is one of the USB-connected units represented by the unit 501 shown in FIG. 1. The security control unit 5 has a sensor 5a capable of sensing vibration and impact, thus detecting any illegal attempt such as theft or mischief. Upon detection of such an attempt, the security control unit 5 produces an alarm by, for example, causing a siren 5b to go off. The telephone unit 6 also is a form of the USB-connected units 501 shown in FIG. 1. The telephone system 6 controls the function of an automotive telephone, so as to enable conversation through a handset 6b and a telephone antenna 6a, via a wireless telephone circuit such as of mobile or cellular phone.

1-2. Internal Structure of the Main Unit

Figure 3:
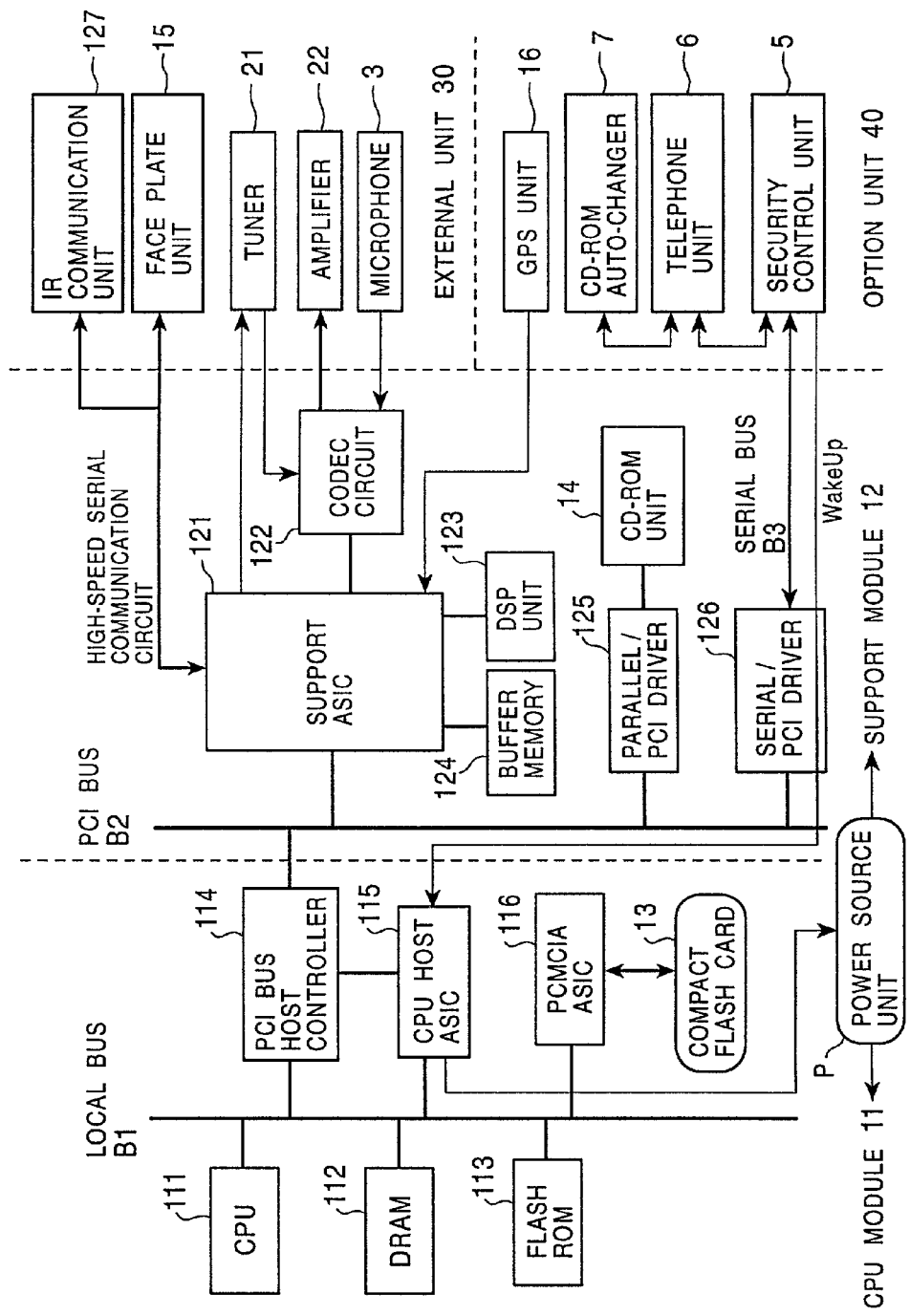
FIG. 3 is a block diagram showing the internal structure of the main unit.

FIG. 3 is a block diagram showing the major components of the automotive information system. It will be seen that the arrangement shown in FIG. 3 is divided by broken lines into four sections: namely, a CPU module 11 which is at the left-hand side of the drawings, a support module 12 which is at the middle, external unit 30 at the right upper section and option unit 40 shown at the right lower section. The CPU module 11 and the support module 12 are incorporated in the main unit 1.

The term "external unit 30" collectively refers to external units that are connected to the main unit 1. Likewise, the term "option unit 40" collectively refers to option units that are connectable to the main unit 1. In FIG. 3, the compact flash card 13 is shown at the bottom of the CPU module 11, while the face plate unit 15 is shown at an upper part of the external unit 30, for the sake of convenience of explanation.

The CPU module 11 and the support module 12 in combination constitute the controlling computer that performs overall control of the whole automotive information system. More specifically, the CPU module 11 is constituted mainly by a CPU 111 and is adapted to conduct logical computations and processings, while the support module 12 controls the delivery and receipt of data to and from other units that constitute the automotive information system.

In the CPU module 11, a local BUS B1 (referred to also as a "first BUS"), formed around the CPU 111, serves as a major path for data transmission, whereas, in the support module 12, a major path of data is constituted by a PCI (Peripheral Component Interconnect) BUS B2 which interconnects the devices or units of the automotive information system and which is referred to also as a "second BUS".

1-2-1 Configuration of CPU Module

The local BUS B1 of the CPU module 11 is of the type which conforms with the type of the CPU 111. To this local BUS B1 are connected a DRAM 112, a flash ROM 113, a PCI BUS host controller 114, a CPU host ASIC 115, and a PCMCIA ASIC 116. The DRAM 112 provides a work area such as a variable area that is used by the CPU 111 when the latter controls the automotive information system.

The flash ROM 113 is a rewritable ROM which stores software in general sense, including an OS, BIOS and application program. The OS stored in the flash ROM 113 has functions such as administration of resources available on the computer, control of input and output including the user interface, execution of predetermined programs, and so forth. For instance, the OS may be formed based on the general purpose OS known as Windows CE mentioned before.

The PCI BUS host controller 114 interconnects the local BUS B1 and the PCI BUS B2, and performs conversion of data exchanged between these two types of BUSes, so as to make the data conform with the BUS to which the data is to be delivered.

To explain in more detail about the CPU host ASIC 115, the term "ASIC" is an abbreviation of "Application Specific Integrated Circuit". More specifically, ASIC is a circuit such as an IC or an LSI designed for a specific use, in contrast to general-purpose ICs such as a ROM, RAM or CPU.

The CPU host ASIC 115 serves as an interface between the local BUS B1 and the PCI BUS host controller 114. The CPU host ASIC 115 therefore serves as an entrance or exit for the data to be exchanged between the PCI BUS B2 and the CPU module 11. More specifically, the CPU host ASIC 115 works in lieu of the CPU 111 so as to conduct input and output of data to and from the CPU module 11 and, in addition, selects data to be delivered to the CPU 111 from among various kinds of data received from the PCI BUS B2.

The CPU host ASIC 115 delivers the selected data to the CPU 111 via the local BUS B1. Other data than those selected are the data which need not be processed by the CPU 111, i.e., data that needs to be responded by predetermined reactions. When such other data is received, the CPU host ASIC responds to this data by giving the predetermined reaction.

The PCMCIA ASIC 116 provides an interface adapted for the data delivered to and from the compact flash card 13 which is a kind of so-called PC card that meets the standards of PCMCIA (Personal Computer Memory Card International Association). Thus, the PCMCIA ASIC 116 controls writing and reading of data to and from the compact flash card 13. Therefore, the CPU module 11 serves as a computer that controls the delivery of information to and from the compact flash card 13 that is mounted in the slot 13S.

The main unit 1 has a power supply section P that controls, by means of relays for example, the power supply to the CPU module 11 and the support module 12. The CPU host ASIC 115 and the power supply unit P in cooperation form the power control unit 183 of the main unit 1 shown in FIG. 2. The communication unit 183 shown in FIG. 2 includes a serial/PCI driver 126.

1-2-2 Configuration of support module

The PCI BUS B2 of the support module 12 is used for exchanging data between the CPU module 11 and various devices constituting the automotive information system. Thus, the PCI BUS B2 serves as transmission means that transmits audio data and digital data from the devices of the system, both the digital data and the audio data that is transmitted in the form of digital signals. To the PCI BUS B2 are connected the external unit 30 which collectively refers to a plurality of units or devices and the option unit 40 which also collectively refers to a plurality of units or devices.

More specifically, the external unit 30 is separate from the main unit shown in FIG. 1. In this embodiment, the external unit 30 includes the face plate unit 15 that is detachable from the main unit 1, the tuner 21 and the amplifier 22 that are included by the tuner amplifier unit 2, and the microphone 3. The face plate unit 15 is equipped with the infrared communication unit 127 mentioned before.

The option unit 40 includes devices or units that can be selected by the user. Namely, whether such devices or units are to be incorporated in the automotive information system is determined by the user. In this embodiment, the GPS unit 16 and the CD-ROM auto-changer 7 are the option components. The CD-ROM unit 14, that is incorporated in the main unit 1, also is connected to the PCI BUS B2. This CDROM unit 14 is a player which reads data from a CD or a CDROM. If the CD is a music CD, audio data is read by the CDROM unit 14. Both the CD-ROM auto-changer 7 and the CD-ROM unit 14 are compatible in that they are capable of reading music data from the music CD and reading data from a CD-ROM.

Exchange of data between the PCI BUS B2 and the devices or units connected thereto is performed in the support module 12, by using a support ASIC 121, a CODEC circuit 122, a DSP unit 123, a buffer memory 124, a parallel/PCI driver 125, and the serial/PCI driver 126.

The support ASIC 121 is a circuit that determines the destination of the data exchanged between the support module 12 and the units or devices connected thereto. Thus, the support ASIC 121 performs a traffic control of the data between the support module 12 and the devices or units. As to the CODEC circuit 122, the term "CODEC" is an abbreviation of "Coder/Decoder", i.e., coding and decoding of data. For instance, the CODEC circuit 122 performs D/A conversion for converting data in the form of digital signals into analog signals and A/D conversion for converting analog signals into digital data. Thus, the CODEC circuit 122 serves as the A/D conversion means that converts analog signals derived from the units or devices into audio data having the form of digital signals, and serves also as D/A conversion means that converts the digitally processed audio data into analog signals. This CODEC circuit 122, together with the amplifier 22 for activating the speaker with the analog signals, form the audio output means that outputs the processed audio data in the form of analog signals.

As to the DSP unit 123, the term "DSP" is an abbreviation of Digital Sound Processor, i.e., a circuit which exclusively processes digital sound signals. Upon receipt of audio digital data such as music data, the DSP unit 123 processes the audio digital data in such a manner that the produced sound conforms with the conditions set in the audio system, such as the balance between left and right sounds, volume, fader, surround and equalizer.

The cycle time of reading and writing data through the PCI BUS B2 is different from that of the acoustic instrument such as the CD-ROM unit. The buffer memory 124 accommodates this difference by storing data and outputting the data bit by bit. The buffer memory 124 is constituted by, for example, an SRAM.

The parallel/PCI driver 125 serves to transform the parallel audio data or parallel digital data sent from the CD-ROM unit 14 into data that conforms with the PCI BUS B2. The serial/PCI driver 126 serves as data form conversion means that converts serial audio data and serial digital data transmitted in the form conforming with the USB via the cable B3 into data of the form that conforms with the PCI BUS B2.

As stated before, the signal line Wake Up is additionally incorporated in the cable B3. The signal line Wake Up is one of interrupt signal lines connected to the CPU host ASIC 115 of the CPU module 11.

The face plate unit 15 including the infrared communication unit 127 is connected to the support ASIC 121 via a high-speed serial communication circuit. The CPU module 11 is capable of exchanging data between itself and an external device such as a separate handheld computer, by means of the infrared communication unit 127 and via the PCI BUS B2, support ASIC 121 and the above-mentioned high-speed serial communication circuit.

The GPS unit 16 also is connected to the support ASIC 121 via a communication circuit such as an asynchronous serial communication circuit, e.g., an UART (Universal Asynchronous Receiver-Transmitter). The CD-ROM unit 14 is connected to the parallel/PCI driver 125, through a parallel communication circuit such as an ATAPI (At Attachment Packet Interface). Although not shown, an ASIC that undertakes exchange of data by means of infrared rays is provided in the infrared communication unit 127.

The CPU module 11, together with the CODEC circuit 122, DSP unit 123 and the buffer memory 124 of the support module 12, forms the processing means that processes digital data and audio data in the form of digital signals.

1-2-3. Configuration of CPU Host ASIC

Figure 4:
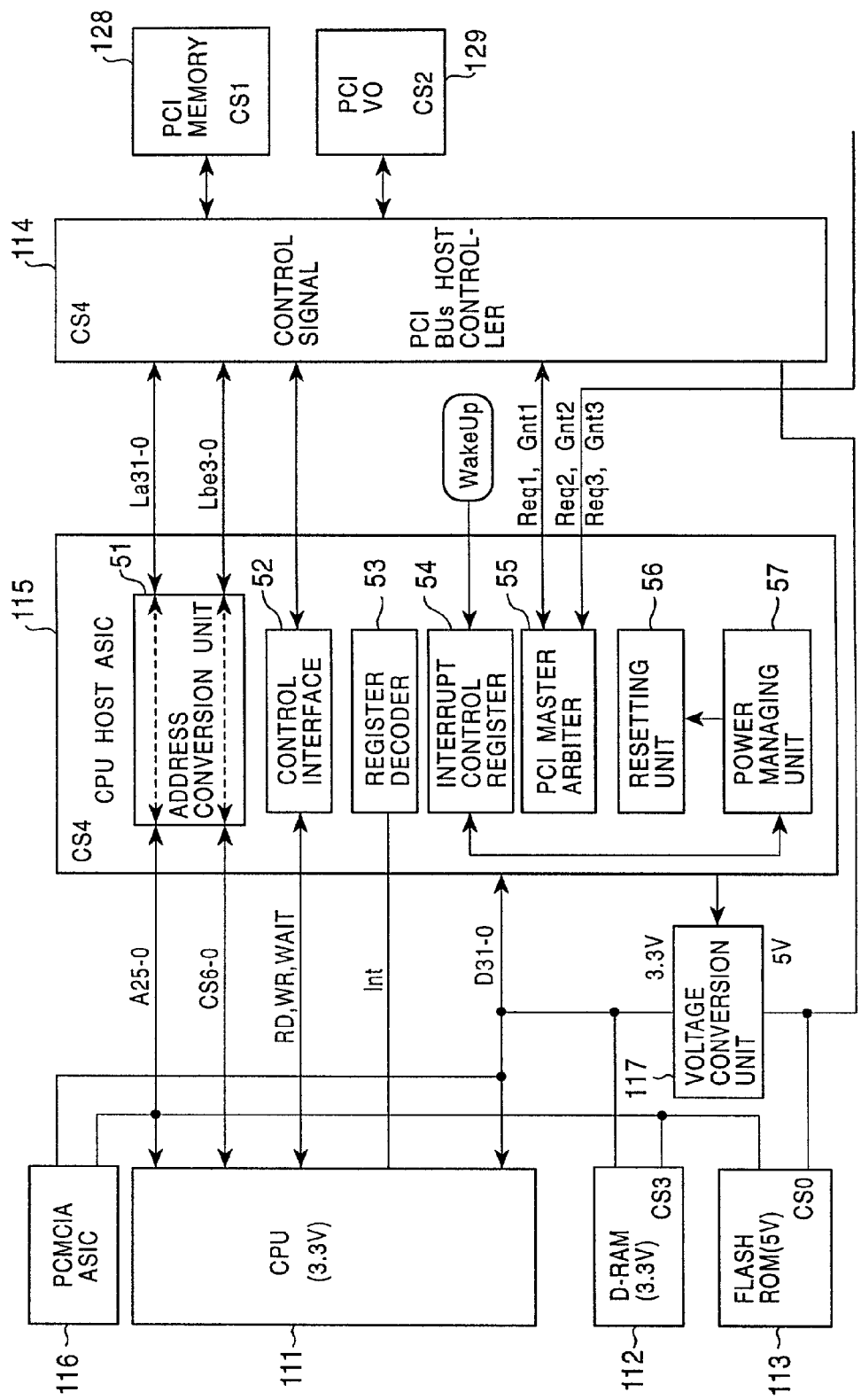
FIG. 4 is an illustration of a practical form of the configuration of a CPU host ASIC incorporated in the automotive information system.

A description will now be given of the configuration of the CPU host ASIC 115 that undertakes exchange of information between the CPU module 11 and the support module 12. FIG. 4 is a function block diagram showing the configuration of the CPU host ASIC 115 and other components connected to the CPU host ASIC 115. As will be seen from this Figure, the CPU host ASIC 115 has an address conversion unit 51 which performs operations including address conversion that is needed when the devices of the CPU module 11 are accessed through the PCI BUS B2.

1-2-3-1. Interrupt Control Register

The CPU host ASIC 115 has an interrupt control register 54 that determines, for each of a plurality of interrupt signal lines connected to the CPU host ASIC 115, whether the interruption is to be validated or invalidated. In this embodiment, a complicated control can be performed without difficulty, by virtue of the interrupt control register 54 that determines whether the interruption is to be accepted, for each of the plurality of interrupt signal lines.

Figure 5:
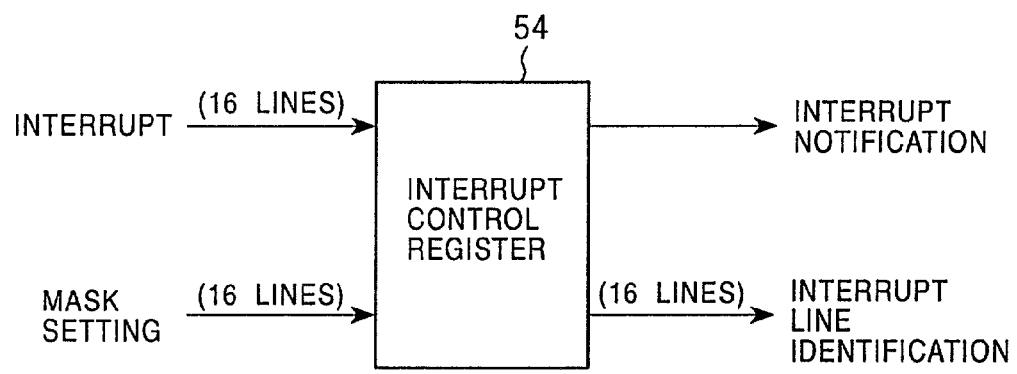
FIG. 5 is an illustration of the configuration of an interrupt control register incorporated in the automotive information system.

FIG. 5 shows the signal lines connected to the interrupt control register 54. It will be seen that there are 16 (sixteen) interrupt signal lines connected to the interrupt control register 54. Different interrupt signal lines corresponds to different kinds of interruption. One of these interrupt signal lines is the line through which a start signal to be used for starting up the main unit 1 is sent from the security control unit 5.

One of bits of the interrupt control register 54 is allocated for each of the sixteen interrupt signal lines. The bit is set to "1" when the interruption is to be accepted, whereas, when the interruption is not to be accepted, the corresponding bit is set to "0". The value "1", as well as the value "0", will be referred to as a "mask". These masks are stored in the interrupt control register 54 via a 16-bit mask-setting signal line.

Figure 6:
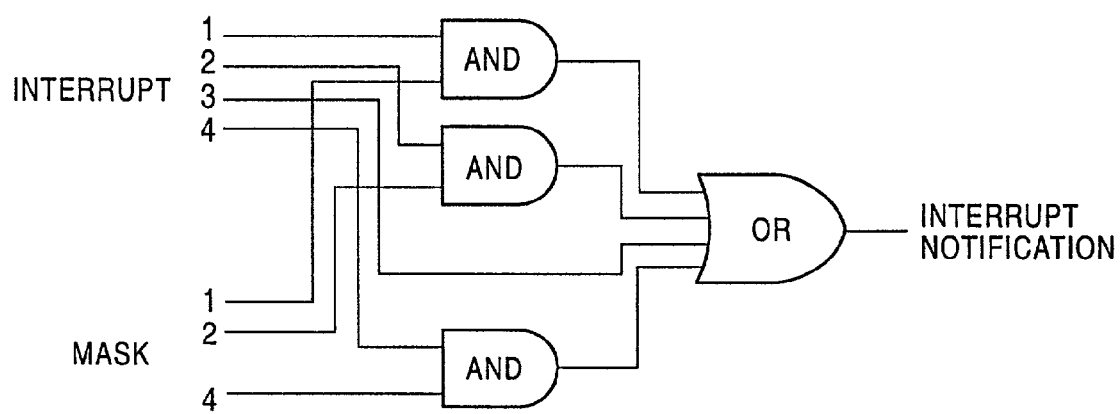
FIG. 6 is an illustration of the processing performed by the interrupt control register.

The interrupt control register 54 has logical circuits and other necessary registers that are used in processing the masks that have been stored and the interrupt signals that are received through the interrupt signal lines. FIG. 6 is an illustration of the concept of the processing of the masks stored in the interrupt control register 54 and the interrupt signals.

Referring to FIG. 6, for the purpose of interruption, "1" is input to the associated interrupt signal line, and the logical product (AND) of the input signal "1" and the mask value of the corresponding bit is computed by the interrupt control register 54. The interrupt control register 54 then determines the logical sum (OR) of the ANDs computed for the respective signal lines. As a consequence, an output "1" is obtained as an interrupt notification, regardless of which one of the interrupt signal lines has requested the interruption. The statuses of the signal lines are stored in another register. The contents of this register is referred to through an interrupt line identification line shown in FIG. 5 when the interrupt notification is obtained, so that the interrupt line through which the interruption has been requested can be identified.

It is to be noted that the setting of the mask is prohibited for the interrupt signal line Wake Up which is used exclusively for the transmission of the start signal from the security control unit. More particularly, the bit in the register 54 corresponding to the interrupt signal line Wake Up is fixed to "1" that admits the interruption.

1-2-3-2. PCI Mask Arbiter

The CPU host ASIC 115 has a PCI mask arbiter 55, as will be seen from FIG. 4. Referring back to FIG. 3, connected to the PCI BUS B2 are the parallel/PCI driver (IDE controller) 125 corresponding to a controller of the parallel interface and the serial/PCI driver (USB controller) 126 corresponding to a serial BUS controller.

The PCI master arbiter 55 constitutes arbitration means that arbitrates the right to occupy the PCI BUS B2 among the three sections: namely, the PCI BUS host controller (PCI controller) 114, the parallel/PCI driver 125 and the serial/PCI driver 126.

1-2-3-3. Other Components

The CPU host ASIC 115 has a control interface 52, a register decoder 53, a resetting unit 56, and a power managing unit 57. When the devices or units connected to the local BUS B1 and the PCI BUS host controller 114 are accessed by each other for the purpose of, for example, reading and writing of data, the control interface 52 performs the control of the timing and procedure of the writing or reading, by using control signals. The register decoder 53 performs setting of various conditions such as the operation mode of the CPU host ASIC 115, in accordance with signals derived from the CPU 111.

The power managing unit 57 controls the power supply section P shown in FIG. 3 so as to manage the pattern of supply of the power to various portions of the circuitry, i.e., to which portion or portions of the circuitry the power is to be supplied, which varies according to the state of the CPU 111, e.g., normal operating condition, a stand-by condition or a sleeping condition. These conditions will be fully described later. A specific circuit is provided to act between the interrupt control register 54 described above and the power managing unit 57, so as to control the power managing unit 57 upon detection of the interrupting start signal. When a start signal is received, this specific circuit controls the power managing unit 57 so that the power supply to the main unit 1 is turned on.

The resetting unit 56 resets various devices or units when the automotive information system is started up. In the CPU module 11, the software for activating the CPU 111 has been stored in the flash ROM 113, so that the resetting unit 56 operates to reset the flash ROM 113 in advance of resetting the CPU 111.

The CPU module 11 has a voltage conversion unit 117 that performs conversion of voltage of signals which are exchanged between devices or units adapted for different signal voltages. The CPU host ASIC 115 determines, depending on the source and the destination of each signal, whether the voltage conversion is to be performed and in which direction the voltage conversion is to be effected, and controls the voltage conversion unit 117 in accordance with the results of the determination.

2. Operation

The operation of the embodiment having the described configuration is as follows.

2-1. Overall Operation

2-1-1. Input of Data

Among various types of data received from the units or devices, digital data are directly delivered to the support ASIC 121 of the support module 12. For instance, data identifying the key touched by the user is derived from the face plate unit 15. Digital data such as longitude and latitude, computed based on the radio waves from GPS satellites, are derived from the GPS unit 16. The infrared communication unit 127 of the face plate unit 15 delivers digital data transferred from the handheld personal computer 8 by way of infrared rays.

The CD-ROM unit 14 and the CD-ROM auto-changer 7 read data from a music CD and from a CD-ROM. The audio data read from the music CD or the digital data read from the CD-ROM is delivered to the PCI BUS B2 after being converted into a form conforming with the PCI BUS 2 by means of the parallel/PCI driver 125 or the serial/PCI driver 126. The data thus converted is sent to the support ASIC 121 through the PCI BUS B2.

Although not shown in FIG. 3, digital data indicating occurrence of an extraordinary event is sent from the security control unit 5 shown in FIG. 1. Likewise, character data in the form of digital signals, indicating receipt of a telephone call and the telephone number of the caller is transmitted from the telephone unit 6 shown in FIG. 1. During the telephone conversation, audio data, i.e., voice data, representing the talk of the caller is delivered to the ASIC 121.

The security control unit 5 and the telephone unit 6 are connected by way of the serial BUS B3 in a daisy-chain fashion. The information sent from the security control unit 5 and the telephone unit 6 are delivered to the main unit 1 via the cable B3, and are sent through the PCI BUS B2, after being converted into a form that conforms with the data form of the PCI BUS 2 by the serial/PCI driver 126, as in the cases of the audio data and the digital data delivered by the CD-ROM auto-changer 7.

Among various types of data received from the units or devices constituting the automotive information system, data in the form of analog signals is delivered to the CODEC circuit 122 so as to undergo an A/D conversion. The data thus converted into digital data is then delivered to the support ASIC 121. Examples of such data received in the form of analog signals are the analog signals representing the user's voice picked up and delivered by the microphone 3, and the analog radio broadcast signals received as a result of tuning performed by the tuner 21 and sent therefrom.

2-1-2. Transfer of Data from CD-ROM Auto-changer

In the CD-ROM auto-changer 7, when audio data is read from the music CD, the ATAPI decoder converts the audio data into the output data in the form of ATAPI data as in the case of the digital data read from the CD-ROM. The ATAPI output data thus obtained is delivered to the USB controller which in turn transfers the output data to the main unit 1 in an isochronous manner via the upstream connector.

2-1-3. Destination of Input Data

As described above, data is read by the CD-ROM auto-changer 7 from a CD, and the read data is sent to the support ASIC 121 of the main unit 1. The support ASIC 121 received data also from various other portions of the system. The support ASIC 121 performs a traffic control so as to determine the destination of various kinds of information received from various units or devices. Briefly, the data received from various units or devices in this embodiment are classified into two types: namely, sound data and other kinds of data. The support ASIC 121 directs the sound data to the DSP unit 123 and, after being processed by the DSP unit 123, sends the processed data to the amplifier 22 via the CODEC circuit 122, whereas the data other than the sound data is sent to the CPU module 11. It is to be noted, however, the sound data that is received from the microphone is sent to the CPU module 11 for the purpose of voice recognition.

Examples of the sound data that are delivered to the amplifier 22 are the radio broadcast sound data tuned by the tuner 21, sound data of music read from a music CD by means of the CD-ROM unit 14 or the CD-ROM auto-changer 7, and the sound data representing the voice of a telephone caller received through the telephone unit 6.

Examples of the data other than the sound data are: data indicating which one of the keys on the face plate unit 15 has been pressed by the user; file data or other data received via the infrared communication unit 127; digital data indicating longitude and latitude received from the GPS unit 16; car navigating map data and other guiding information read from a CD-ROM by the CD-ROM unit 14 or the CD-ROM auto-changer 7; data informing occurrence of extraordinary event, received from the security controller 5; and the data indicating receipt of a telephone call and data indicating the telephone number of the caller, sent from the telephone unit 6.

2-1-4. Information Processing Performed by CPU Module

Upon receipt of digital data from the support ASIC 121, the PCI BUS controller 114 of the CPU module 11 converts the received data into a form that conforms with the data form of the local BUS B1, and delivers the converted data to the CPU host ASIC 115. The CPU host ASIC 115 conducts input and output of data in place of the CPU 111. More specifically, the CPU host ASIC 115 determines whether the received data is to be delivered to the CPU 111 or otherwise, based on the form of the data and other factor.

Thus, when the received data is such one that essentially requires a fixed response without requiring any processing, such a fixed response is sent by the CPU host ASIC 115 back to the support module 12 via the PCI BUS host controller 114. Other kinds of data, i.e., data that require any processing, is directed to the CPU 111.

The CPU 111 processes the data in accordance with the codes of the OS and the programs stored in the flash ROM 113, using the DRAM 112 as a storage area such as work area necessary for the processing. For instance, the CPU 111 upon receipt of data representing user's voice input through the microphone 3 compares the received voice data with parameters and voice waveforms of various instructional words that have been stored beforehand. The CPU 111 then determines, based on the result of matching of parameters and waveforms, the instructional word actually pronounced by the user, and performs operations in accordance with the thus determined instructional word.

Writing and reading of data to and from the compact flash card 13 is conducted in the CPU module 11 in compliance with a request given by the CPU 111. More specifically, such writing and reading is commanded by the PCMCIA ASIC 116 which in turn is under the control of the CPU host ASIC 115.

The results of the information processings performed by the CPU 111 are sent to the support module 12 via the PCI BUS B2, after being converted into a form that conforms with the data form of the PCI BUS B2 by means of the PCI BUS host controller 114. Examples of the data that are sent to the support module 12 as the results of the information processings are instructions concerning operations of various portions of the support module 12 or the units or devices constituting the information system. The support module 12 conducts processings such as input and output of data, in accordance with the data received as the results of the information processings.

2-1-5 Processings such as Input/Output Processing Performed in Support Module

When instructions requesting reading of data from a CD or tuning of the radio are received from the CPU module 11, the CD-ROM unit 14, the CD-ROM auto-changer 7 or the tuner 21 performs operations in accordance with the instructions. When instructions are received from the CPU module 11 requesting change-over of the source of the sound which is output from the speaker, the support ASIC 121 performs a switching operation so that the audio data supplied to the CODEC circuit 122 is switched from audio data derived from one sound source unit to audio data derived from another sound source unit.

The amplifier 22 exclusively deals with analog signals. When audio data that has been digitized is to be delivered to the amplifier 22, such audio data in the form of digital signals is converted into analog signals through a D/A conversion performed by the CODEC circuit 122, and the analog data thus obtained is then delivered to the amplifier 22.

The support ASIC 121, upon receipt of data which is to be displayed for visual recognition by the user and which is derived from the CPU module 11 or other unit or device, delivers the display data to the face plate unit 15 via the high-speed serial communication circuit. The face plate unit 15 then forms visual information based on the received display data and displays the information on its display section for visual recognition by the user.

2-1-6. Operation of CPU Host ASIC

A description will now be given of the operation performed by the CPU host ASIC 115 when the latter conducts information processings of the kind described above.

2-1-6-1. Address conversion and BUS arbitration

The description will begin with the mutual access between a device connected to the local BUS B1, e.g., the CPU 111, and a device connected to the PCI BUS B2, e.g., the support ASIC 121, by way of the host controller 114. In order to enable such mutual accessing operation, the address conversion unit 51 of the CPU host ASIC 111 conducts processings such as address conversion, notification of effective bytes, and so on. In the meantime, the PCI master arbiter 55 arbitrates the right to occupy the PCI BUS B2 among the three sections: namely, the PCI BUS host controller (PCI controller) 114, the parallel/PCI driver 125 and the serial/PCI driver 126.

2-1-6-2. Processing in Regard to Start Signal

A description will now be given of the procedure for starting up the main unit 1 by sending a start signal from one of the USB-connected units 501. The description also will refer to the interrupt processing which uses the interrupt control register 54, management of the electrical power performed by the power managing unit 57 and resetting of the system performed by the resetting unit 56.

In this embodiment, the start signal sent from the USB-connected unit 501 is dealt with by the main unit 1 as being "Wake Up" interruption which is one of the interruptions that are received by the CPU host ASIC 115 of the CPU module 11. As described before, there are 16 interrupt signal lines connected to the CPU host ASIC 115. Interruptions other than the Wake Up interruption are selectively accepted and rejected under the control of the interrupt control register 54 as follows.

Masks are set up in the interrupt control register 54, for the respective interrupt signal lines to determine whether the interruptions requested through the respective interrupt signal lines are to be accepted or rejected. More specifically, "1" is set for each of the bits corresponding to the interrupt signal lines which are to be validated, i.e., the interrupt signal lines which transmit interruptions to be accepted, whereas "0" is set for each of the bits corresponding to the interrupt signal lines that are to be invalidated, i.e., the interrupt signal lines that convey interruptions which are to be rejected.

It is assumed here that a signal "1" indicative of an interruption is received from one of the interrupt signal lines. Then, the logical product (AND) between the interrupt signal "1" and the state of the mask on the bit corresponding to this interrupt signal line is computed. A logical product "1" is obtained when the state of the mask is "1". At the same time, logical products (ANDs) are computed for all the interrupt signal lines, and then the logical sum (OR) of these ANDs is computed. It will be seen that "1" is obtained as the OR, when an interruption request has been received through any one of the interrupt signal lines, so that "1" is output through the interrupt notification line shown in FIG. 5. The states of the respective interrupt signal lines are stored in another register the content of which is accessible through the interrupt identification line shown in FIG. 5. It is therefore possible to identify the interrupt signal line through which the interruption request has been received, by referring to the content of this another register through the interrupt identification line.

It is prohibited to set up a mask for the interrupt signal line Wake Up. More specifically, setting "0" on the bit of the register corresponding to the Wake Up interrupt line is invalid, and the value of the mask on the bit corresponding to the Wake Up interrupt signal line is fixed to "1". In this system, the CPU module 11 is not completely dead even when the power supply of the automotive information system is turned off after normal use of the system. Namely, the sensor of the security control unit 5 remains alive. In addition, the aforementioned circuit for monitoring receipt of interrupt through the Wake Up interrupt line also is operative without using clock. This state of the system will be referred to as "sleep", hereinafter.

The state or operation mode of the main unit 1 is under the control of the power managing unit 57. More specifically, the power managing unit 57 can choose one from among the following operation modes of the main unit 1, although whether all the following modes are available depends on the system configuration: (1) normal mode of operation such as playing back of music; (2) a stand-by mode; (3) a suspend mode; (4) the sleep mode; and (5) an "off" mode. The power managing unit 57 determines to what portion or portions of the circuit the electrical power is to be supplied, for each of these available modes of operation.

The nature of each of these modes also depends on the system configuration. In general, however, the "suspend" mode is a mode which waits for instructions, while the "stand-by" mode is a power-saving mode. The operation is automatically switched to the "stand-by" mode when neither an ordinary processing such as that for playing back music nor operation by the user is conducted for a predetermined period of time. In this "stand-by" mode of operation, portions of the circuit that consume much electrical power such as fluorescent display tubes, amplifier and so forth are turned off, while the BUSes and clock of the CPU module 11 remain alive.

In the above-mentioned "sleep" mode of operation, the simple interrupt monitoring circuit alone is kept operative, so that consumption of the automotive backup battery power is negligibly small. Exhaustion of battery does not occur even when the automobile is kept parked for several tens of days. In this embodiment, the main unit 1 is automatically turned to the "sleep" mode, when the power of the automotive information system or ACC (accessory) power is turned off in a normal way.

Figure 7:
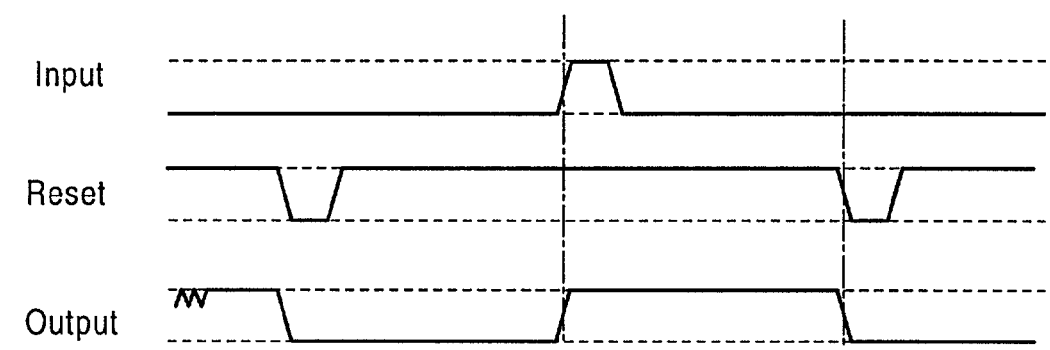
FIG. 7 is an illustration of a change in the signal handled by an interrupt signal monitoring circuit.

FIG. 7 shows, by way of example, a circuit suitable for monitoring occurrence of an event without relying on clock signals. This circuit operates such that the level of its output is changed from LOW to HIGH when the level of input connected to an interrupt signal line is changed from HIGH to LOW or from LOW to HIGH. The power managing unit 57 operates to turn on the power supply to the automotive information system in response to a change from LOW to HIGH of the output of this monitoring circuit. This output is maintained until it is canceled by the CPU 111 when the normal operating state of the CPU 111 is recovered as a result of starting up of the automotive information system.

Figure 8:
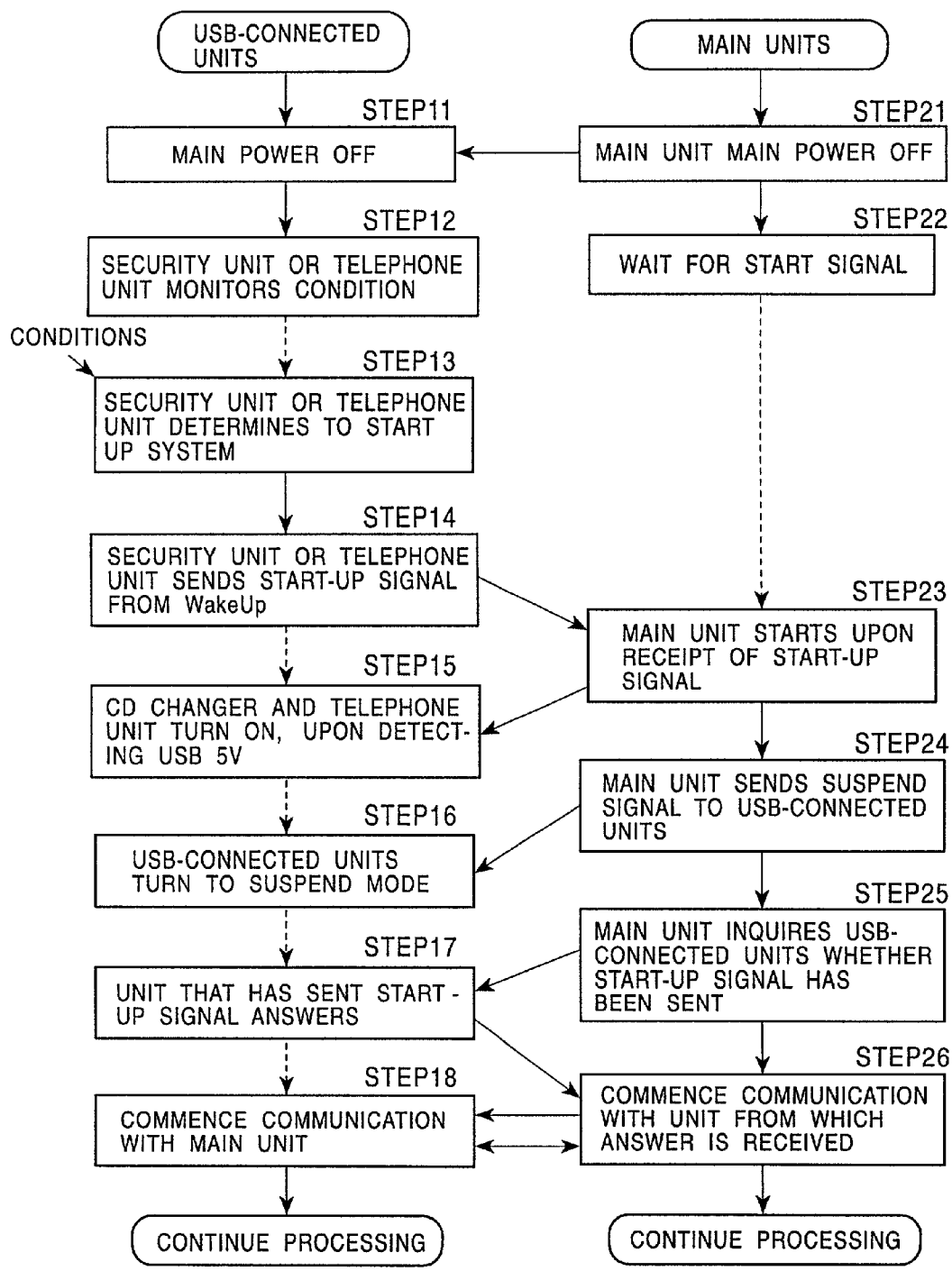
FIG. 8 is a flowchart showing the process for turning on power supply to the main unit by a start signal given by a component device.

FIG. 8 illustrates the process which is executed when power supply to the main unit 1 is turned on by a triggering or start signal sent from a USB-connected unit 501 (see FIG. 2) connected to the main unit 1.

Referring to FIG. 8, when the power supply to the whole automotive information system is turned off, the main power supply to the main unit is turned off (Step 21) and, in addition, the main power supply to the USB-connected unit is also turned off (Step 11). In this state, the detecting unit 512 of the USB-connected unit 501 monitors whether a predetermined condition for starting up the main unit 1 has been satisfied (Step 12). In the meantime, the start signal receiving unit 184 of the main unit 1 waits for the start signal (Step 22).

In case of the security control unit 5 that is one of the above-mentioned USB-connected units 501, the above-mentioned predetermined condition is detection of an impact or vibration by a sensor 5*a* of the security control unit 5. In case of the telephone unit 6 which is another example of the USB-connected units 501, the predetermined condition is the receipt of a telephone call.

Upon detecting that the predetermined condition has been satisfied, the detecting unit 512 sends a signal to the power control unit 513 to start up the whole USB-connected unit 501. The USB-connected unit 501, i.e., the security control unit 5 or the telephone unit 6, determines to start up the main unit 1 (Step 13), so that the start signal transmitting unit 514 sends the start signal to the main unit 1 via the communication unit 511, through the Wake Up signal line included in the cable B3 (Step 14).

Figure 9:
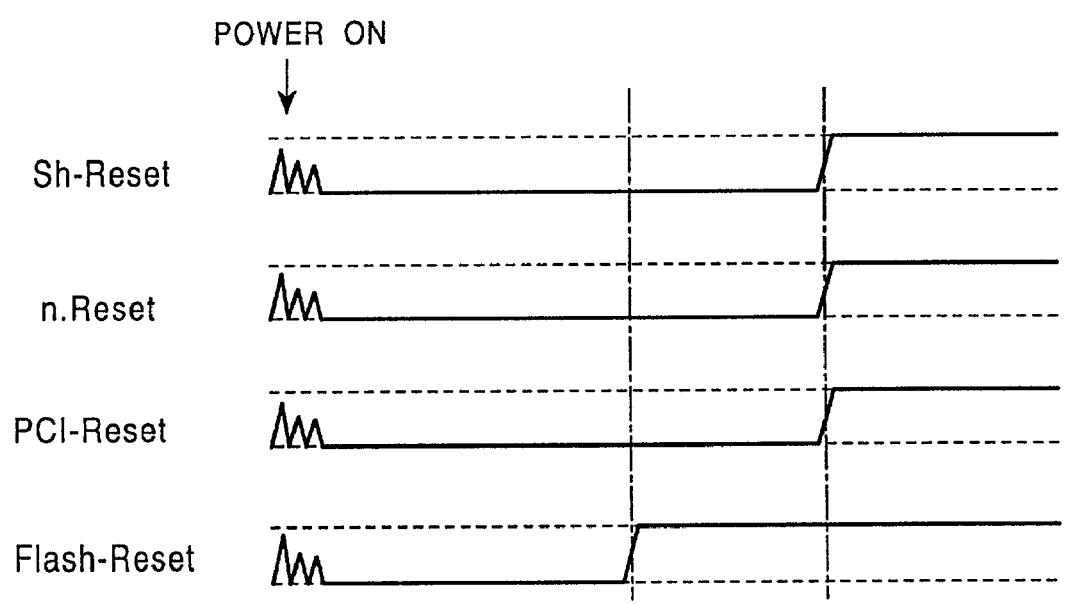
FIG. 9 is an illustration of a change in a reset signal employed in the automotive information system.

When this start signal reaches the communication unit 181 of the main unit 1, the start signal receiving unit 184 detects the start signal, with the result that the whole automotive information system is turned on by the operation of the power control unit 183. The devices or units of the system are reset by the resetting unit 56 in response to the start of the automotive information system. FIG. 9 shows the manner in which a plurality of units or devices including the flash ROM 113 are reset to change their statuses to HIGH. As will be seen from this Figure, the resetting unit 56 resets the flash ROM 113 first, before resetting other devices or units.

The main unit 1 is thus turned on, so that the communication unit 181 of the main unit 181 operates to supply each device or unit with electrical power through the first power line (+5) of the cable B3. As a consequence, another USB-connected unit 501, e.g., the telephone unit 6, and the other type of USB-connected unit 71, e.g., the CDROM auto-changer 7, are started up by the +5V power supplied thereto, so as to be turned on (Step 15). At the same time, the main unit 1 delivers a suspend signal (Step 24) to each USB-connected unit that has been turned on, so that each USB-connected unit is switched to the "suspend" mode. Each USB-connected unit therefore waits for instructions, while being supplied with the electrical power.

Then, the inquiring unit 185 of the main unit 1 inquires each USB-connected unit whether the USB-connected unit is the sender of the start signal (Step 25). One of the USB-connected units, which has sent the start signal, answers the inquiry through its answering unit 515 to inform the main unit 1 that this unit is the very one that has sent the start signal. The main unit 1 thus identifies the source of the start signal and determines what kind of processing is to be performed on the identified answering USB-connected unit 501. As a consequence, the USB unit 501 that has sent the answer and the main unit 1 start to communicate with each other (Steps 18, 26), so as to execute processings such as those for informing occurrence of extraordinary event or for connecting the telephone call.

2-1-6-3. Voltage Conversion and other Operations

The D-RAM 112 handles signals of, for example, 3.3 V, while the flash ROM 113 deals with signals of 5 V. In this embodiment, the voltage conversion unit 117 converts the signal voltage when the signals are exchanged between the units that operate with different signal voltages. It is therefore possible to combine such units which operate at different signal voltages. This serves to enhance the degree of freedom of system design and to permit more efficient processing of data.

More specifically, when exchange of data between devices or units has become necessary, the CPU host ASIC 115 identifies these devices or units between which the data is to be exchanged, and determines whether a voltage conversion is necessary. The CPU host ASIC 115, when it has decided that the conversion is not necessary, does not activate the voltage conversion unit 117. In contrast, when the CPU host ASIC 115 has decided that a conversion is necessary for accomplishing the data communication between the devices or units, it determines the direction of the voltage conversion to be performed, e.g., from 3.3 V to 5 V or vice versa, depending on the source and the destination of the data transmission, and controls the voltage conversion unit 117 accordingly to execute the voltage conversion.

For the purpose of enabling mutual access between the PCI BUS host controller 114 and a device or unit connected to the local BUS B1, the control interface 52 serves to control the timing, as well as procedure, of reading and writing of data, by using control signals. The register decoder 53 sets up various conditions such as the operation mode of the CPU host ASIC 115, in accordance with the signal sent from the CPU 111.

Control of operation for writing and reading data in and from the D-RAM 112 is usually conducted by the CPU 111. It is possible, however, that data is directly transferred from the PCI BUS B2 to the D-RAM 112 by DMA transmission. To this end, the CPU host ASIC 115 serves in place of the CPU 111, so as to enable writing and reading data in and from the R-RAM 112, by generating signals such as RAS and CAS.

A description will now be given of the kinds of services or functions offered to the user by the above-described efficient data processings performed by the respective portions of the automotive information system.

2-2. Use of Utility Programs

The computer of the automotive information system of the described embodiment may be loaded with various utility functions such as an address book function, calendar function, schedule managing function, voice recording, timepiece function, calculator function, game function and so forth, implemented by the OS or application programs, as in the case of ordinary handheld personal computers. The user while on board can conduct various kinds of work by making effective use of these functions. Application programs implementing such functions may be removed, replaced with another program or a new application program may be added, so that the user can set up information processing environment that best suits to the user.

2-3. Use of compact flash card

Exchange of information is possible between the automotive information system and other information device such as a handheld personal computer or another automotive information system, by making an efficient use of the compact flash card 13.

For instance, a new application program or a new OS can be read from the compact flash card 13 and written in the flash ROM 113. This facilitates addition of new functions and updating of the OS. In particular, the use of the general-purpose OS permits ordinary software developers to easily form function modules based on the application programs and the OS. Compact flash card 13 storing such a function module becomes available correspondingly easily, so that the users can use the automotive information systems more conveniently in the same sense as ordinary personal computers.

Personal data such as address book prepared by using an ordinary personal computer or handheld computer may be transferred to the automotive information system by way of the compact flash card 13. The user therefore can continue the work while on the automobile by using the automotive information system. Likewise, data formed by using the automotive information system can be transferred to other computers such as an ordinary personal computers or handheld computers, by making use of the compact flash card 13.

The data formed on the automotive information system by using aforesaid functions may be copied on the compact flash card 13. Such a copy can effectively be used as backup data. When data on the automotive information system has been extinguished accidentally due to, for example, a malfunction of the system, the backup data is read from the compact flash card 13 so as to be written in the main unit 1, whereby the original data are restored.

When an automobile is used by a plurality of persons, e.g., family members, each user can set up various conditions of the automotive information system in accordance with his or her favor, and can store a backup copy of the set conditions in his or her own compact flash card 13. When he or she uses the automobile, his or her favorite conditions are restored simply by insertion of the compact flash card 13 in the main unit 1, even when the conditions have been changed by another person who used the automobile during the interval. Each user therefore can use the automotive information system always under the best conditions.

2-4. Communication with Separate Handheld Personal Computer

The automotive information system of the described embodiment is capable of communicating with a separate personal computer or a handheld computer by using the IrDA (Infrared Data Association) communication port, thus implementing wider scope and application of information processed by the automotive information system.

For instance, exchange of data between the automotive information system and a separate handheld computer 8 can easily be performed by means of the infrared communication unit 127, without requiring troublesome work such as the insertion and withdrawal of the compact flash card 13 or connection by means of a connector cable. Thus, various kinds of work can be conducted, such as updating of the OS or the application programs by using files stored in the handheld personal computer 8, transfer of personal data such as address book formed on the automotive information system directly to the handheld personal computer 8, making backup data for such personal data in a comparatively large storage area available on the handheld personal computer 8, transfer of conditions set on one automotive information system to the automotive information system on another automobile, and so on.

2-5. Display of Operations and Information

The user can operate the automotive information system either by pressing keys arranged on the face plate unit 15 or by pronouncing predetermined words corresponding to respective kinds of services or functions. For instance, the user can enjoy services available from a CD, either by pressing an operation key for switching the information source to the CD or by uttering a word "Si-Di" (CD) such that the voice can be caught by the microphone 3. Similarly, the user can select the FM tuner by pressing a key for tuning to FM waves, or by pronouncing "Efu-Emu" (FM).

When a key is pressed by the user, data concerning the key operated by the user is transferred from the support ASIC 121 to the CPU module 11, so that the CPU 111 forms new display data which is sent to the face plate unit 15 via the support ASIC 121. Accordingly, the display section of the face plate unit 15 forms an image such as that for enabling radio operation or CD player operation based on the display data, and displays this image to enable the user to operate the radio or the CD player.

In contrast, the voice instructions given by the user such as "Si-Di-" is picked up by the microphone 3 which forms audio data in the form of analog signals corresponding to the voice instructions. This analog audio data is converted by the CODEC circuit 122 into audio data of digital form. The digital audio data thus obtained is sent from the support ASIC 121 to the CPU 111 via the PCI BUS controller and the CPU host ASIC 115. Based on the audio data of digital form, the CPU 111 recognizes the word uttered by the user and, based on the result of the recognition, performs the same operation as that performed in response to pressing of the key.

The arrangement may be such that the display section of the face plate unit 15 is constructed as a touch panel, and a graphical user interface for the computer is presented by icons displayed on the touch panel and corresponding to functions available when the user interface is used. Thus, a function is activated when a user's finger touches at an icon corresponding to the function and displayed on the touch panel. It is possible to combine the above-described graphical user interface with the voice recognition function described before. For instance, a plurality of display screens each containing a group of icons are prepared and used selectively such that, when the user utters a word "Ne-Ku-Su-To" (Next), the display screen is switched to the next one, whereas, when a word "Ri-Ta-A-N" (RETURN) is uttered, the display screen is switched back to the screen that immediately precedes the screen now on display.

2-6 Listening to Radio

As stated above, the user can select the FM broadcast service by uttering the word "Efu-Emu" (FM). When this voice input is recognized by the CPU 111, the support ASIC 121 switches the tuner 21 to a mode for selecting FM waves, in response to an order given by the CPU 111. The support ASIC 121 also performs switching of the source of the data to be delivered to the amplifier 22, such that voice data from the tuner 21 is supplied to the amplifier 22. The arrangement may be such that the tuner 21 receives the wave of the frequency to which the receiver was tuned when the FM broadcast service was selected last time. It is also possible to implement an automatic sweeping function such that frequencies to which the receiver is tuned are sequentially chased by a stepwise change of tuning frequencies in response to a word "Si-I-Ku Appu" (SEEK UP) pronounced by the user.

When the automotive information system has been set to enable the user to listen to the radio, the received broadcast data is sent in the form of analog signals from the tuner 21. These analog signals are input to the CODEC circuit 122 so as to be changed into audio data of digital form. The digital audio data thus obtained is then delivered to the support ASIC 121. The support ASIC 121 delivers the digital audio data to the DSP unit 123 which processes the digital audio data in accordance with conditions such as the balance, volume and so forth that have been set on the system. The DSP unit 123 then sends the processed digital audio data back to the support ASIC 121.

The support ASIC 121 sends the digital audio data back to the CODEC circuit 122 that converts the digital audio data again into analog signals. The analog audio data thus obtained is sent to the amplifier 22, whereby audio output is produced by the speaker.

2-4. Playback of CD

The user wishing to listen to music reproduced from a music CD sets the desired music CD on the CD-ROM unit 14 or the CD-ROM auto-changer 7, and inputs playback instructions by, for example, uttering a word "Su-Ta-A-To" (START) or by giving instructions to skip to the next music.

For instance, for the purpose of playing back a music CD in the CD-ROM unit 14, the CD-ROM unit 14 operates in accordance with instructions given by the support ASIC 121, whereby audio data in digital form is produced and delivered by the CD-ROM unit 14.

This digital audio data is converted by the parallel/PCI driver 125 into a form that conforms with the data form of the PCI BUS B2, and the thus converted digital audio data is sent to the support ASIC 121 via the PCI BUS B2. Upon receipt of the digital audio data from the PCI BUS B2, the support ASIC 121 delivers the data to the DSP unit 123 so that the digital audio data is processed by the DSP unit 123. The digital audio data after the processing is sent from the DSP unit 123 back to the support ASIC 121 which in turn delivers the processed digital audio data to the CODEC circuit 122 via an I/O port. The CODEC circuit 122 converts the digital audio data into analog signals which are then delivered to the amplifier 22.

If the playback of the music CD is performed by the CD-ROM auto-changer 7, the audio data in the form of serial data sent from the serial BUS B3 is converted by the serial/PCI driver 126 into data of a form that conforms with the data form of the PCI BUS B2. Thereafter, operations are performed in the same way as those in the playback performed by the CD-ROM unit 14.

Playback devices such as the CD-ROM unit 14 and the CDROM auto-changer 7 produce and send comparatively large volumes of data in comparatively long cycle times, while the CODEC circuit 122 and the DSP unit 123 process data bit by bit with much shorter processing cycle time. Consequently, a difference in cycle time exists between the playback devices such as the CD-ROM unit 14 and the CD-ROM auto-changer 7 and the data processing means such as the CODEC circuit 122 and the DSP unit 123. In addition, since the playback devices and the data processing means operate based on different clock signals, there is a risk that an error is incurred due to difference in the time reference based on which the operation speeds are determined.

It is necessary to accommodate this difference in cycle time, in order that the audio data is smoothly reproduced. To this end, the support ASIC 121 operates such that a batch of data sent from the CD-ROM unit 14 or the CD-ROM auto-changer 7 is stored in the buffer memory 124, and data is picked up bit by bit from the batch of data and delivered to the DSP unit 123 in the order of time, i.e., such that the oldest data is processed first followed by processing of the data which is next to the oldest.

More specifically, the support ASIC 121 starts to read data from the buffer memory 124 when data has been written in the buffer memory 124 up to half the capacity of the buffer memory 124, and determines the relationship between the length of time required for the writing data and the length of time required for reading the data, It is therefore possible to process audio data while keeping pace with the reading of data, regardless of any difference between the clock used as the time reference for the operation of the CD-ROM auto-changer 7 and the clock relied upon by the main unit 1.

2-8. Use of CD-ROM and Car Navigation System

When the user wishes to use a function of the car navigation system, the user sets in, for example, the CD-ROM unit 14 a CD-ROM which stores car navigation data including application software, map data and so on. The user than starts the car navigation function. The car navigation function may be implemented by a program to be executed by the computer. In such a case, the program is stored in the flash ROM of the CPU module 11, and is executed by the CPU 111 as required.

When the car navigation system is used to read data recorded in the CD-ROM such as map data and other data concerning various kinds of regional information, the data is read by, for example, the CD-ROM unit 14, and the thus read digital data is delivered to the CPU 111 via the parallel/CPI driver 125, PCI BUS host controller 114, and the CPU host ASIC 115. Upon receipt of the data such as the map data, the CPU 111 develops a bit map image on the DRAM 112 based on the received data, in order that the map is displayed on the face plate unit 15. The bit map image is then transmitted to the support module 12.

When the car navigation system is used, radio waves from GPS satellites are caught by the GPS antenna 4 shown in FIG. 1, and the GPS unit 16 shown in FIG. 3 computes the position in terms of longitude and latitude based on the received waves. The position data obtained through this computation is sent to the CPU 111. Based on the position data including the longitude and latitude, the CPU 111 performs computation to locate the instant position of the automobile on which the car navigation system is mounted, by showing the position on a displayed map. Thus, the instant position of the automobile is set as a starting position, so that a map is displayed centered at the instant position, as well as graphical instructions such as indication of a corner at which the automobile should turn to the left or right.

The data to be used for the car navigation may also be stored in the compact flash card 13, the DRAM 112 or in the flash ROM 113.

The voice recognition function described before for commanding the automotive information system can also be employed in the car navigation. For instance, when the car navigation system is of the type which gives a guide such as turning left or right at each crossing or corner, the user can scroll or switch forward or backward the display screen by giving voice instructions such as "Ne-Ku-Su-To" (next) or "Ri-Ta-A-n" (RETURN), when the user wishes to see the next guiding information or immediately preceding guiding information.

The guiding information may be given in the form of synthesized voice message via the amplifier 22. Such a voice guiding function relieves the driver from the burden of glancing the display again and again in order to know the crossing or corner at which the automobile should turn next time.

2-9. Use of Telephone

The user on the automobile can communicate with a distant person through the telephone unit 6. In such a communication, the merits of both the computer and the car audio system are utilized as follows. For instance, the user registers, in the DRAM 112 or in the compact flash card 13, names and telephone numbers of the acquaintances, by using the program on the computer.

It is also possible to arrange such that the names of registered persons and corresponding telephone numbers are successively displayed on the display screen. When the name and the phone number of a specific person are displayed, the user touches an icon representing the telephone calling function. As a result, the displayed phone number in the form of digital data is transmitted from the CPU module 11 to the telephone unit 6, so that the telephone unit 6 automatically rings up the designated person at the displayed phone number. If the designated person is on the phone, telephone conversation can be started right away. In accordance with this arrangement, the user can make telephone call simply by designating a telephone number from the telephone directory.

The arrangement also may be such that the user pronounces the name of a person registered in the directory so that the CPU module recognizes the pronounced name to cause the telephone unit to automatically ring up the person. Alternatively, the user pronounces the phone number digit-by-digit or utter a word "Ri-Dai-A-Ru" (redial) so as to be recognized by the CPU module 11, so that the CPU module 11 causes the telephone unit to automatically call a person at the designated phone number.

2-10. Receipt of Phone Call and Hand-free Telephone Conversation

When a telephone call is received while the whole automotive information system is operative, digital data indicating receipt of the call and digital data indicating the telephone number of the caller are delivered by the telephone unit 6 to the support ASIC 121 via the serial BUS B3 and the serial/PCI driver 126. These digital data are sent to the CPU 111 of the CPU module 11. The CPU 111 retrieves the registered telephone numbers to find whether or not the telephone number of the caller exists in the list of the registered telephone numbers.

If the caller's telephone number is found in the list, the CPU 111 sends data indicating the name of the person corresponding to the telephone number thus found in the list back to the support module 12. The name of the caller is then displayed on the face plate unit 15 or announced by a voice message stating "PHONE CALL FROM MR. XXX", so that the user can be informed of the name of the person who is calling.

In contrast, when a telephone call is received while the power supply of the automotive information system has been turned off, the following processing is performed. As the first step, the receipt of the telephone call is detected by the telephone unit 6, so that the telephone unit 6 sends a start signal to the main unit 1 to start up the latter. In response to this start signal, the power supply to the main unit 1 is turned on, whereby the main unit 1 is started up to become operative. As a consequence, other units or devices connected to the automotive information system are also turned on. Once the power supply to the main unit 1 is turned on in response to the start signal given by the telephone unit 6, notification of receipt of the telephone call is given to the user in the same procedure as that for the telephone call received when the automotive information system is in the normal operating condition.

The user can be connected to the telephone call by, for example, operating a switch or by uttering a predetermined word. Such a switch operation or word is detected by the main unit 1 which in turn gives a connecting instruction signal to the telephone unit 6 so as to cause the telephone unit 6 to connect the telephone call to the main unit 1. Before the connection is achieved, the voice of the caller and the voice of the user are exchanged in the form of digital data through the cable B3. Once the received telephone call is connected to the main unit 1, the main unit 1 operates so that the caller's voice is output from the speaker via the amplifier 22, while picking up the user's voice by means of the microphone and sending it to the caller, thus helping the user to communicate with the caller on the phone.

The user is thus informed of the receipt of the call and the name of the caller by the visual or voice message or by a specific calling signal or tone. The user then vocally gives instructions to connect the caller to the user, so that the telephone is hung on, whereby the caller's voice is output from the speaker. At the same time, the user's voice is picked up as analog data through the microphone 3 and is digitized by the CODEC circuit 122. The digital audio data thus obtained is sent to the telephone unit 6 via the support ASIC 121, serial/PCI driver 126 and the serial BUS B3, whereby a hand-free conversation is conducted without requiring the user to use his hand.

The arrangement may be such that a message-keeping function prepared in the telephone unit 6 or the CPU module 11 automatically responds to the telephone call after a predetermined number of calling signal sounds are produced.

2-7 Use of security control unit

The security control unit 5 may stand alone or may be operatively associated with the telephone unit 6 mentioned above. For instance, referring to FIG. 1, the user when leaving the automobile sets the security control unit 5 operative and carries the transmitter 5c with him. Impacts or vibrations produced by any unlawful attempt by unauthorized person, such as touching at a door knob, picking a key hole, forcing a door or trunk lid open, or moving the automobile, is sensed by the sensor 5a. The security control unit 5, upon receipt of a signal from the sensor 5a, operates to allow an alarming means such as a siren to go off loudly, whereby occurrence of unlawful event is informed to the surroundings.

The user when returning to the automobile operates the transmitter 5c, so that a predetermined secret code is transmitted to the security control unit 5 to dismiss the security function. The siren therefore does not goes off even if the user uses the key or drive the automobile.

2-12. Combination Between Security Control Unit

The security control system 5 can function more effectively when combined with the telephone unit 6. For instance, the security control unit 5 not only activates the siren but also produces an interrupt signal, i.e., the start signal, when any abnormal state is sensed by the sensor 5a.

This interrupt signal is sent to the main unit 1 so that the whole automotive information system including the CPU module 11 and the support module 12 is turned on. As a result, the telephone unit 6 is turned on to become ready for calling.

Upon receipt of the data indicative of occurrence of an extraordinary event sent from the security control unit 5, the CPU 111 gives instructions to the telephone unit 6 so as to cause it to ring up a telephone that has been registered, thereby informing a person at the registered phone number of the occurrence of extraordinary event by means of, for example, synthesized voice.

More specifically, the CPU 111 started up in response to the interrupt signal receives data indicative of the type of the extraordinary event sent from the security control unit 5, and transmits an instruction to the telephone unit 6 to cause the latter to call a predetermined telephone number that has been registered as where to contact in case of emergency, e.g., police, mobile telephone carried by the user, a security company, or the like. When the telephone unit is hung on at the opposite station, e.g., at the police, synthetic voice message or a recorded voice message is automatically sent thereto to inform occurrence of extraordinary event. The person informed of occurrence of such an event can hasten to the site. It is thus possible to obtain a remarkable anti-theft or security effect.

3. Advantages

As will be understood from the foregoing description, the present invention offers various advantages.

As will be understood from the foregoing description, various advantages are offered by the present invention, as stated below.

Firstly, it is to be appreciated that the power supply to the main unit 1 can be turned on by using a simple arrangement which enables a USB-connected device or unit to send a start signal to the main unit 1. Consequently, the functions of the telephone unit and the security control unit can efficiently be utilized to expand the utility of the automotive information system. In addition, in the described embodiment, the source of the device or unit which has sent the start signal to the main unit 1 can be identified through an inquiry made by the main unit 1. This eliminates the necessity for providing separate interrupt start signal lines for different devices or units, thus contributing to simplification of the construction.

In the described embodiment, the supply of electrical power through the first power line which is employed also in the known systems is not conducted when the power supply to the main unit 1 has been turned off. The devices or units, however, are supplied with electrical power from, for example, existing automotive backup battery power supply, through the second power line which is additionally employed in accordance with the present invention. It is therefore possible to send the start signal to the main unit 1, by means of the power supplied through the second power line and using a signal line which also is added in accordance with the present invention. Thus, the described embodiment employs a communication BUS that is implemented by adding the second power line and the signal line to a known cable such as a USB (Universal Serial Bus). This not only enables exchange of various kinds of data between the main unit 1 and devices or units connected thereto, but also eliminates the necessity for the provision of a separate power cable for the purpose of enabling supply of electrical power to the main unit 1 when the primary power supply to the main unit 1 has been turned off, as well as the necessity for a separate signal cable for the purpose of transmitting the start signal, thus affording a simplification of the system structure.

In the described embodiment of the invention, the power supply to the main unit 1 is automatically turned on by a start signal sent from the security control unit when an abnormal event has been detected by the security control unit. The main unit 1 then operates to cause the telephone unit 6 to inform a person of the occurrence of the abnormal event. The person who has received the information can make haste to the site, whereby a greater security effect can be obtained than that offered by a mere activation of siren or the like. Further, in the described embodiment, the power supply to the main unit 1 that has been kept off can be automatically turned on whenever a wireless telephone call such as a call via an automotive or cellular phone circuit is received. The received telephone call can automatically be connected to the user in response to a predetermined responding operation performed by the user, so that a hand-free telephone conversation can be made through the speaker and the microphone on the automobile, with the aid of an amplifier which is inherently incorporated in the main unit 1 of the automotive information system for the purpose of amplification of audio signals.

It is also to be noted that, in the described embodiment of the present invention, the computer used for controlling the automotive information system has a general-purpose OS that administrates the resources such as a CPU and memories of the computer so as to permit full use of the ability of the computer. The general-purpose OS also provides a user-friendly standardized user interface which is easy to use and which has no dependency on the programs. Further, the general-purpose OS permits addition or modification of a program having a predetermined form, thus facilitating addition or modification of the functions to be performed by the computer. For these reasons, the general-purpose OS serves to facilitate the control of complicated automotive information system.

4. Modifications

It is to be understood that the embodiment has been described by way of example only and may be changed or modified as follows. For instance, the configurations shown in FIGS. 1 to 6, the process shown in FIG. 8 and the forms of signals shown in FIGS. 7 and 9 are only illustrative, and may be changed or modified within the scope of the present invention. At the same time, the functions or services offered by the described automotive information system are also illustrative. It is not essential that all these functions and services are available on the automotive information system.

There is no restriction in the types and number of the devices or units connected to the main unit of the automotive information system, and standards of cables connecting the devices or units to the main unit may selected without limitation. Although a daisy-chain-type connection has been mentioned specifically, this is not exclusive and connection may be achieved by using a cable other than the described USB. The connection also may be of star type which has a central hub to which all lines are concentrically connected. It is to be understood, however, the specific cable described in the foregoing constitutes an invention by itself.

The type of the start signal, as well as the condition for triggering the start signal, may be selected freely. It is also possible to use an exclusive circuit for starting the main unit by the start signal, in place of using interruption to the CPU module 11. In the described embodiment, whole automotive information system becomes operative when the power supply to the main unit is turned on. This, however, is not essential and the arrangement may be such that only selected component devices or units that are necessary for achieving the intended function are activated depending on the source of the start signal.

The form of the inquiry sent from the main unit to each component device or unit, as well as the form of the answer given by the device or unit, may be determined freely. It is also to be understood that the USB-connected unit that has a function to start up the main unit constitutes an invention by itself and, similarly, the main unit 1 that can be started up by a USB-connected unit constitutes an invention by itself, although the described embodiment of the automotive information system includes both the main unit 1 and the USB-connected units.

The type of the sensor to be incorporated in the security control unit, the type of the signal informing occurrence of abnormal event, and the actual method of notification through the telephone may be determined without restriction. Actual method of enabling conversation through the speaker and the microphone also is freely selectable.

The function blocks such as the interrupt control register 54, PCI master arbiter 55 and so forth may be implemented as parts separate from the CPU host ASIC 115 or may be partly omitted. The standards and types of components such as PCMCIA, IrDA, ATAPI, USB, PCI BUS and so on are also illustrative and may be substituted with equivalent components of different types and standards.

A second embodiment of the present invention will be described below with reference to FIGS. 3 and 10 to 16. An automotive information system of the second embodiment is basically the same in entire configuration as that of the first embodiment except that the system includes a CD-ROM auto-changer which outputs both audio data and digital data in the same protocol format. The following description is therefore primarily focused on such features.

[1-1-2. CD-ROM Auto-changer]

Figure 10:
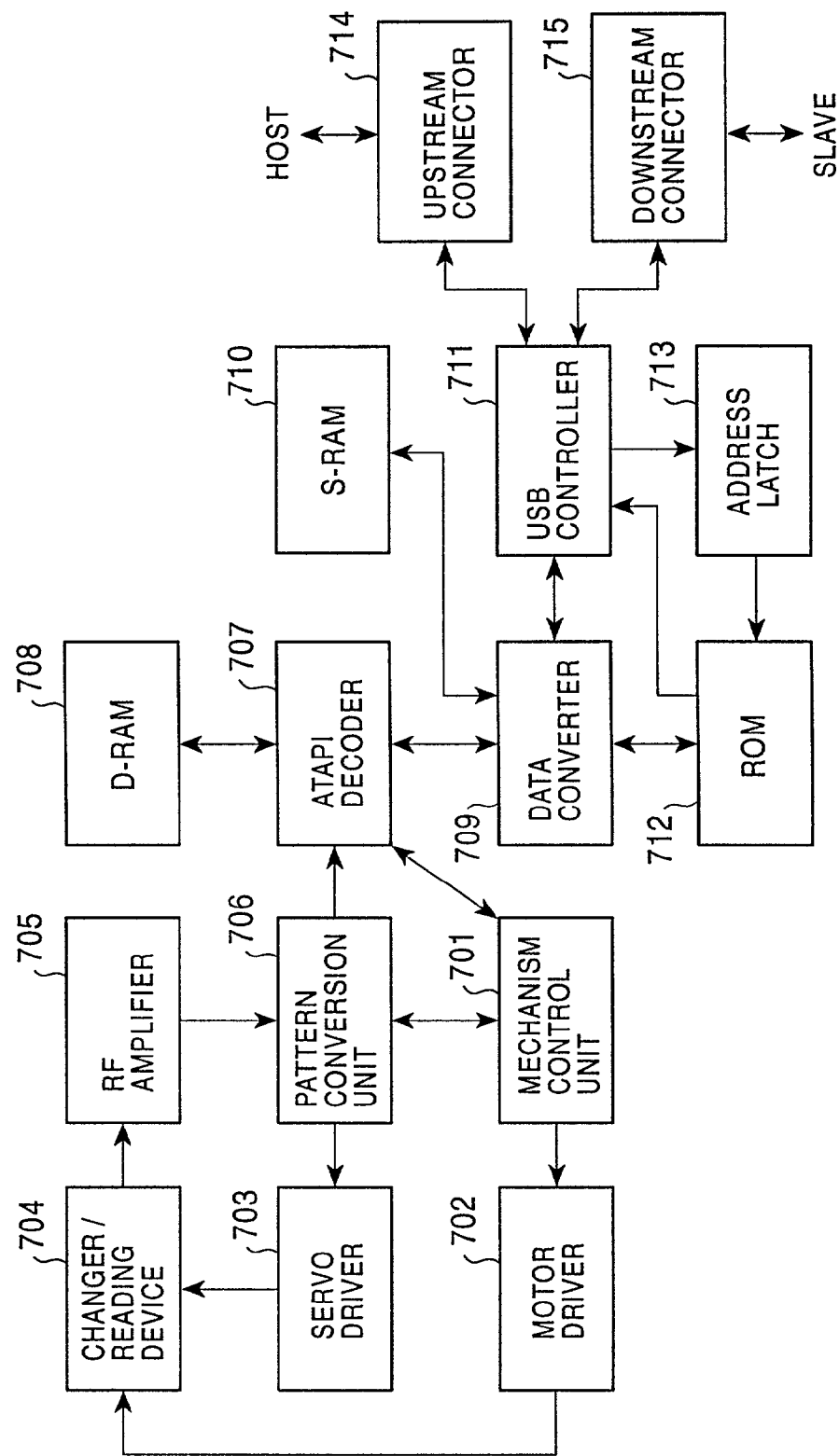
FIG. 10 is a function block diagram showing the configuration of the CD-ROM auto-changer used in a second embodiment of the present invention.

FIG. 10 shows a detailed configuration of a CD-ROM auto-changer 7. The CD-ROM auto-changer 7 is an apparatus for automatically setting a plurality of musical CDs or CD-ROMs from one to another, reading audio data from the musical CD and digital data from the CD-ROM in accordance with a command transmitted from a USB line, and outputting the read data to the USB line.

[1-1-2-1. Configuration for Reading Data]

Specifically, the CD-ROM auto-changer 7 comprises a mechanism control unit 701, a motor driver 702, a servo driver 703, a changer/reading device 704, an RF amplifier 705, and a pattern conversion unit 706.

The mechanism control unit 701 interprets an ATAPI command transmitted from a USB by using a microcomputer, and controls motors and other components in accordance with the contents of the command. The motor driver 702 drives motors for conveying and rotating disks. The servo driver 703 controls a servo mechanism. The RF amplifier 705 is a circuit for amplifying a signal sent from an optical pickup. The pattern conversion unit 706 converts the amplified signal into audio data in digital form or into digital data.

[1-1-2-2. Configuration for Converting and Sending Data]

The CD-ROM auto-changer 7 also comprises an ATAPI decoder 707, a D-RAM 708, a data converter 709, an S-RAM 710 (external memory), a USB controller 711, a ROM 712, an address latch 713, an upstream connector 714, and a downstream connector 715.

The ATAPI decoder 707 converts both audio data read from a CD and digital data read from a CD-ROM into output data in the same protocol format, i.e., in the ATAPI format. The D-RAM 708 provides a work area for use in the conversion made by the ATAPI decoder 707.

The ATAPI decoder 707 and the USB controller 711 have different bus formats from each other in a point, for example, that they have data bus widths of 16 bits and 8 bits, respectively. The data converter 709 converts the format of data transferred between the ATAPI decoder 707 and the USB controller 711.

In particular, the data converter 709 converts the number of bits, which is a unit of output data transferred from the ATAPI decoder 707 to the USB controller 711, from 16 bits to 8 bits corresponding to a difference in data bus width therebetween. Furthermore, the data converter 709 controls DMA transfer for accumulating and taking out the output data converted by the ATAPI decoder 707 in and from the S-RAM 710 which serves as a buffer.

The USB controller 711 converts both the output data converted from audio data and the output data converted from digital data into the same interface format, i.e., the USB format. The USB controller 711 also performs isochronous/bulk transfer of resulting output data to the main unit 1 via the USB. The upstream connector 714 is a connector for connection to a USB cable on the host side, and the downstream connector 715 is a connector for connection to a USB cable on the slave side.

[1-1-2-3. Configuration of ROM and Latch]

The ROM 712 stores a program for controlling the USB controller 711. The address latch 713 is a latch serving as a part of an address bus and a data bus when the USB controller 711 accesses the ROM.

Figure 11:
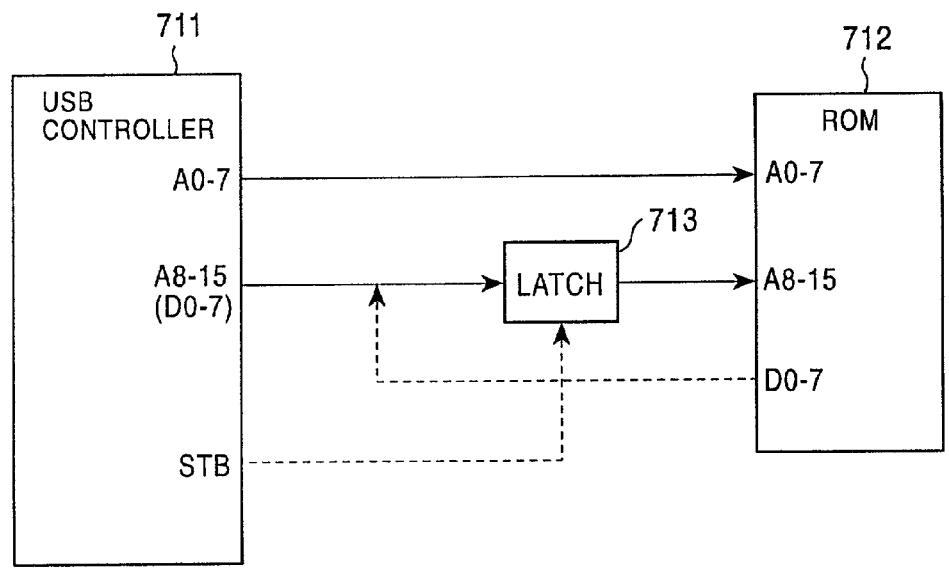
FIG. 11 is an illustration of a concept of address latching function implemented in the second embodiment, in a state in which no strobe signal has been issued.
Figure 12:
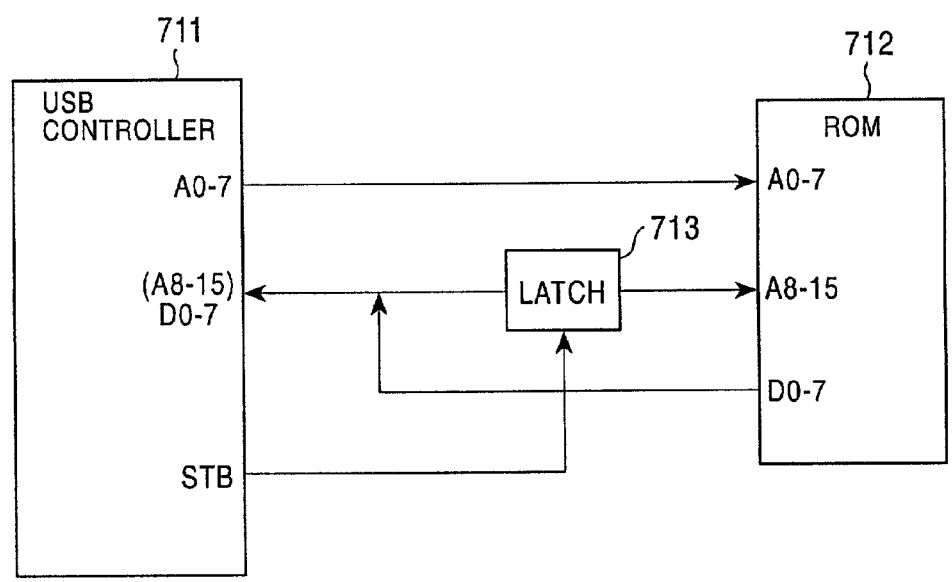
FIG. 12 is an illustration of a concept of address latching function implemented in the second embodiment, in a state in which a strobe signal has been issued.

The relationship among the USB controller 711, the ROM 712 and the address latch 713 is shown in a conceptual block diagram of FIG. 11. More specifically, the USB controller 711 addresses the ROM 712 with 16 bits, and has address output ports A0–A7 for outputting lower-order 8 bits of an address and address output ports A8–A15 for outputting higher-order 8 bits of the address. The address output ports A8–A15 serve also as data input ports D0–D7 for receiving 8-bit data sent back from the ROM 712.

On the other hand, the ROM 712 has address input ports A0–A7 for receiving lower-order 8 bits of an address, address input ports A8–A15 for receiving higher-order 8 bits of the address, and data output ports D0–D7 for sending 8-bit data read from the ROM 712.

The address output ports A0–A7 of the USB controller 711 are directly connected to the address input ports A0–A7 of the ROM 712. The address output ports A8–A15 (serving also as the data input ports D0–D7) of the USB controller 711 are branched midway such that one branch is connected to the address input ports A8–A15 of the ROM 712 via the address latch 713 and the other branch is connected to the data output ports D0–D7 of the ROM 712.

Also, the USB controller 711 has a signal output port STB for outputting a strobe signal to control the address latch 713. When transmitting an address of data to be read to the ROM 712, the USB controller 711 establishes a state shown in FIG. 11. When receiving data from the ROM 712, the USB controller 711 sends a strobe signal from the signal output port STB to the address latch 713, thereby establishing a state shown in FIG. 12.

[1-1-3. Configuration of Data Converter]

Figure 13:
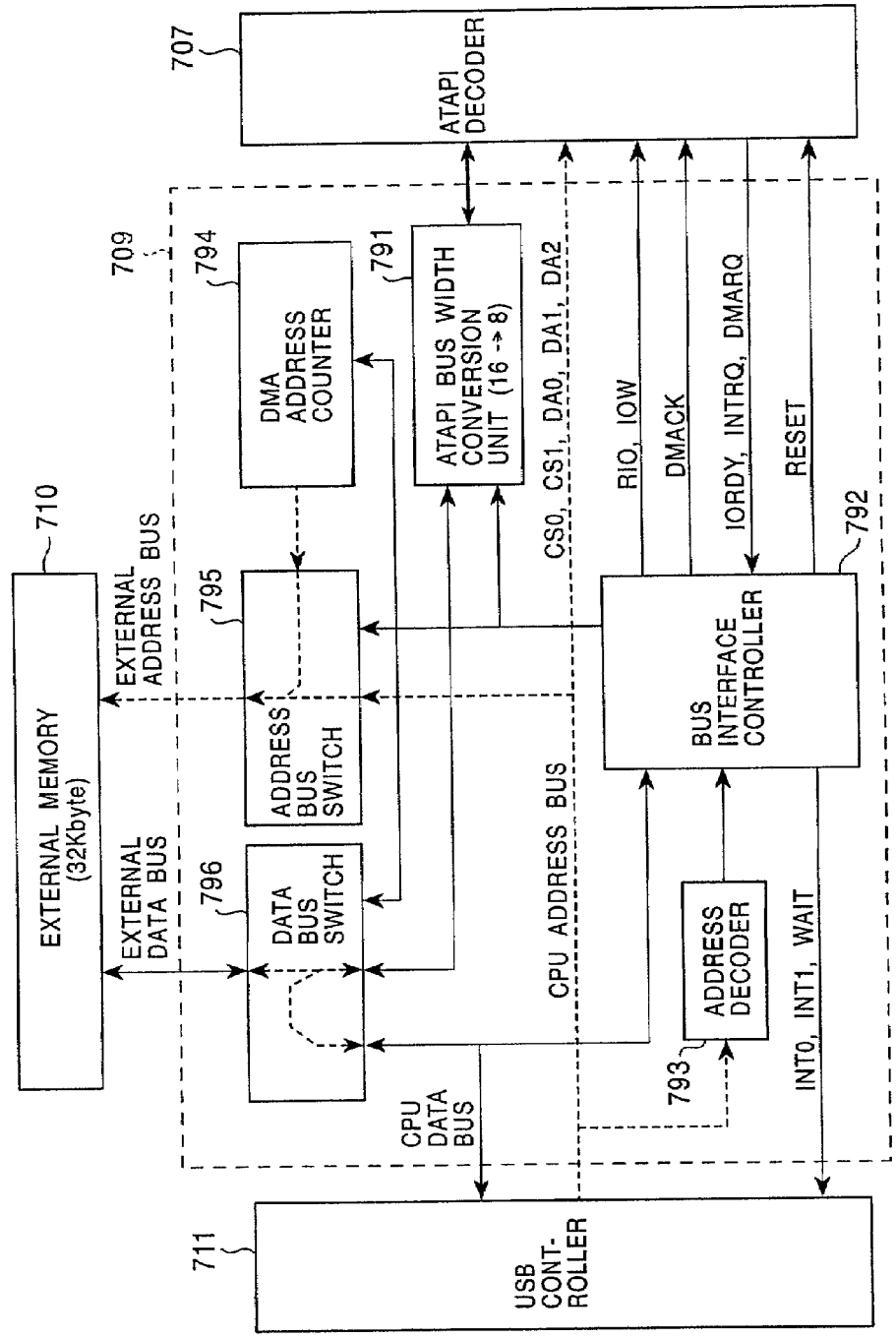
FIG. 13 is a block diagram showing a practical configuration of a data converter incorporated in the second embodiment.

FIG. 13 shows a more detailed configuration of the data converter 709 shown in FIG. 10. The data converter 709 comprises, as shown in FIG. 13, an ATAPI bus width conversion unit 791, a bus interface controller 792, an address decoder 793, a DMA address counter 794, an address bus switch 795, and a data bus switch 796.

The ATAPI bus width conversion unit 791 converts the bit width of parallel data transferred between the ATAPI decoder 707 and the USB controller 711 from 16 bits to 8 bits. The DMA address counter 794 counts up the address of the S-RAM under processing in the DMA transfer. The address bus switch 795 and the data bus switch 796 are switches for changing data flow in accordance with an operating mode of the data converter 709 depending on, e.g., whether the DMA transfer is performed or not.

The address decoder 793 receives a designation instructing whether the DMA transfer is performed or not, or whether the DMA transfer is performed to write data into the S-RAM 710 or read data from the S-RAM 710, and transfers the instruction to the bus interface controller 792. In accordance with the designation, the bus interface controller 792 controls the DMA address counter 794, the address bus switch 795, and the data bus switch 796.

[2-1-2. Processing in CD-ROM Auto-changer]

The operation of the CD-ROM auto-changer 7 for transmitting audio data read from a musical CD and digital data read from a CD-ROM to the main unit 1 via the serial bus B3, i.e., the USB, will be described below.

When utilizing data in any of musical CDs and CD-ROMs set in the CD-ROM auto-changer 7, the main unit 1 first transmits a command packet in the ATAPI format to the CD-ROM auto-changer 7 via the USB (serial bus B3). The command packet designates from which disk and from which part of the disk data is to be read.

When the command packet reaches the upstream connector 714 of the CD-ROM auto-changer 7, it is transferred to the mechanism control unit 701 via the USB controller 711, the data converter 709 and the ATAPI decoder 707. Upon receiving the command packet, the mechanism control unit 701 interprets the contents of the command packet and controls the motor driver 702 to operate the changer/reading device 704, etc., thereby reading data from the designated disk.

For example, if a disk designated by the command packet has been already set in a disk playback unit for reading data from the disk, reading of the data is started at once. If not so, reading of the data is started after the designated disk is loaded in the disk playback unit from a disk magazine or a disk holder.

When the data is read from the disk, the RF amplifier 705 amplifies an output signal from an optical pickup, and the pattern conversion unit 706 converts a pattern of the amplified signal into digital data or audio data as information in digital form.

The information in digital form thus converted from the output signal is converted by the ATAPI decoder 707 into output data in the ATAPI format regardless of whether it is digital data or audio data. The data converter 709 accumulates the thus-converted output data in the S-RAM 710 serving as a buffer, and takes out the accumulated data at the timing of isochronous transfer in the USB, followed by transferring the taken-out data to the USB controller 711. Such a process of accumulating and taking out data is performed under control of the DMA transfer by the data converter 709.

Then, the USB controller 711 supplies the output data in the ATAPI format, having been transferred to it, to the main unit 1 from the upstream connector 714 by isochronous transfer. The isochronous transfer ensures that a certain amount of data determined by software is transferred for a certain period of time, e.g., 1 ms. Thus the isochronous transfer is employed in data transfer wherein a certain amount of data must be transferred for a certain period of time.

For example, audio data read from a musical CD is divided into 75 frames per second, and the amount of data for each frame is 2352 bytes. Because of 1 second/75 frames=about 13.3 ms/frame, 2352 bytes are transferred at a time for each period of time of 13 ms to 14 ms in transfer of audio data. This transfer of audio data employs a transfer capacity of 177 bytes per 1 ms. On the other hand, the maximum transfer capacity of the USB is 1024 bytes per 1 ms. Therefore, supposing that data is transferred from several units at the data rate of 177 bytes per 1 ms, up to five kinds of audio data can be transferred simultaneously in parallel without interruption of music.

[2-1-3. Operation of Data Converter]

A description will now be made on an example in which the data converter 709 converts the data format and changes a path of data flow between the ATAPI decoder 707 and the USB controller 711. More specifically, the data converter 709 shown in FIG. 13 has three kinds of operating modes described below. When the USB controller 711 designates one of the operating modes, the address decoder 793 transmits the designated mode to the bus interface controller 792 which controls and switches over the operating condition of the DMA address counter 794, the address bus switch 795, and the data bus switch 796, thereby realizing the operation in the designated operating mode.

Figure 14:
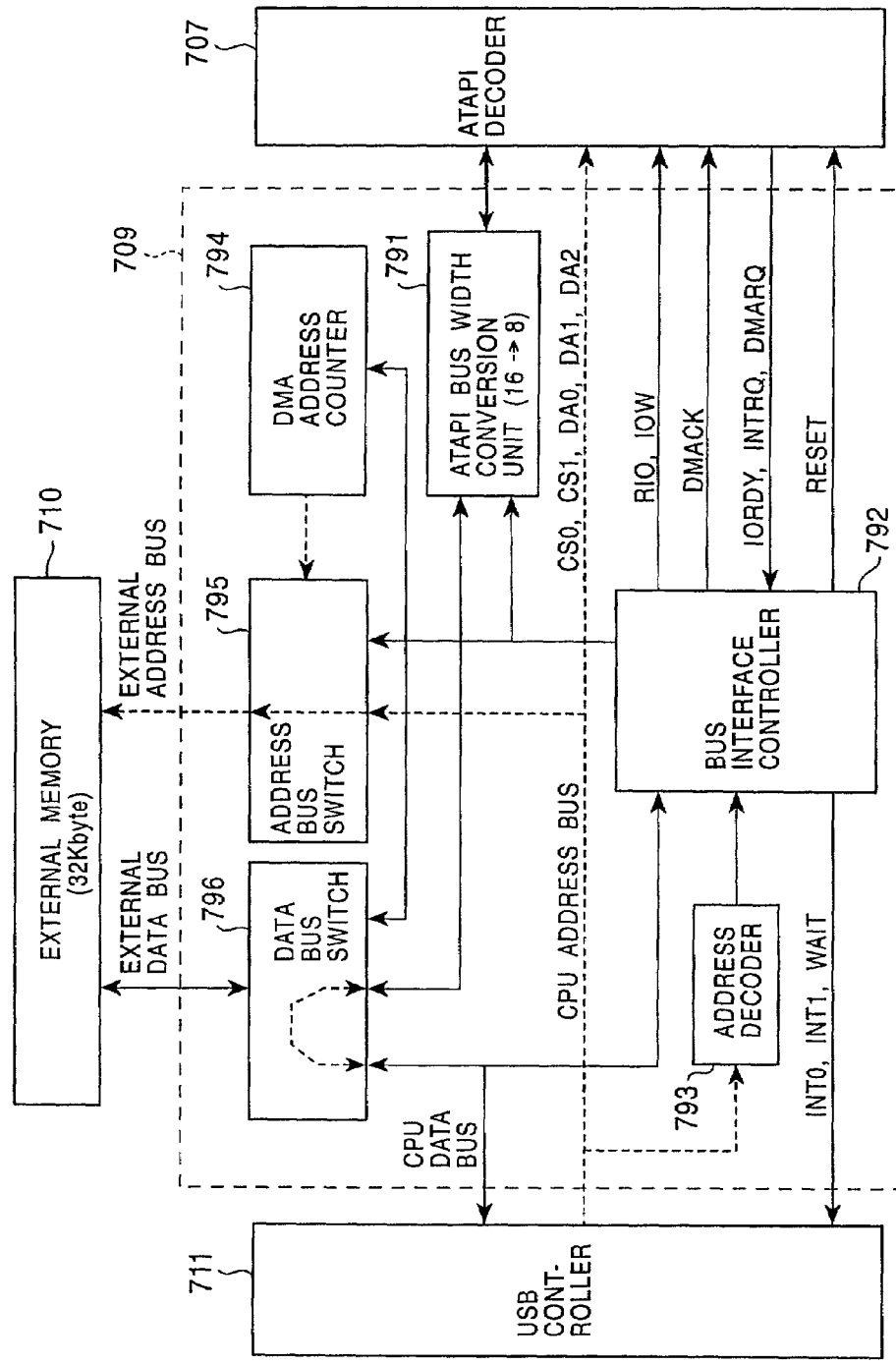
FIG. 14 is an illustration of an operation of the data converter used in the second embodiment, showing particularly the manner in which a USB controller makes access to the ATAPI decoder in an interactive manner.

FIG. 14 shows a state of the data converter 709 in which data is interactively transferred between the USB controller 711 and the ATAPI decoder 707 without using the S-RAM 710. In the state of FIG. 14, the data bus switch 796 connects a data bus of the USB controller 711 to the ATAPI bus width conversion unit 791, and the address bus switch 795 disconnects a CPU address bus from the DMA address counter 794.

Figure 15:
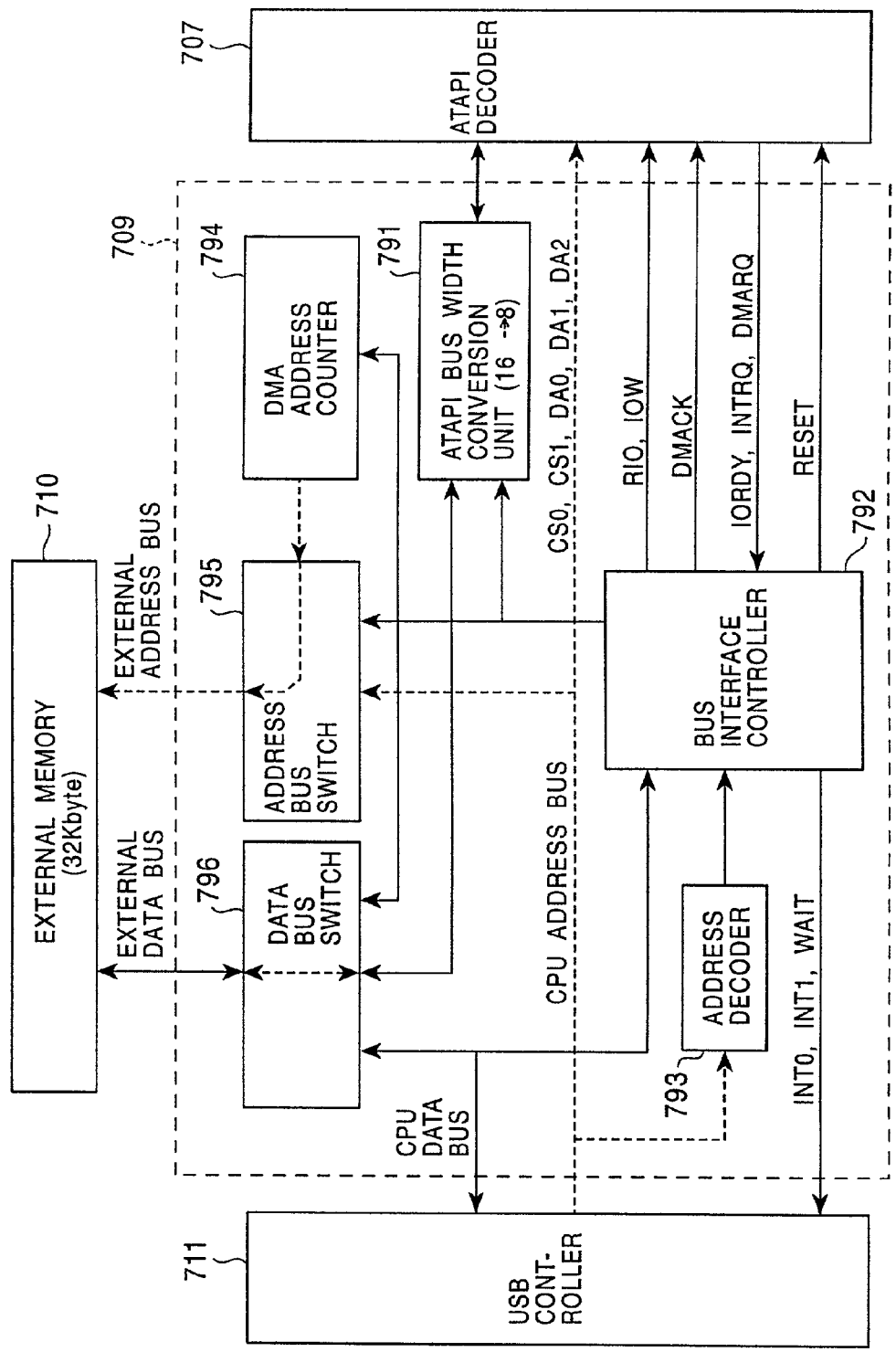
FIG. 15 is an illustration of an operation of the data converter, showing particularly the manner in which the ATAPI decoder writes data in an S-RAM through DMA data transmission.

Next, FIG. 15 shows a state of the data converter 709 in which data is written from the ATAPI decoder 707 in the S-RAM 710 with the DMA transfer. In the state of FIG. 15, the data bus switch 796 connects, to the ATAPI bus width conversion unit 791, an external data bus which is used for reading and writing data from and in the S-RAM 710, and the address bus switch 795 connects, to the DMA address counter 794, an external address bus which is used for reading and writing data from and in the S-RAM 710.

Figure 16:
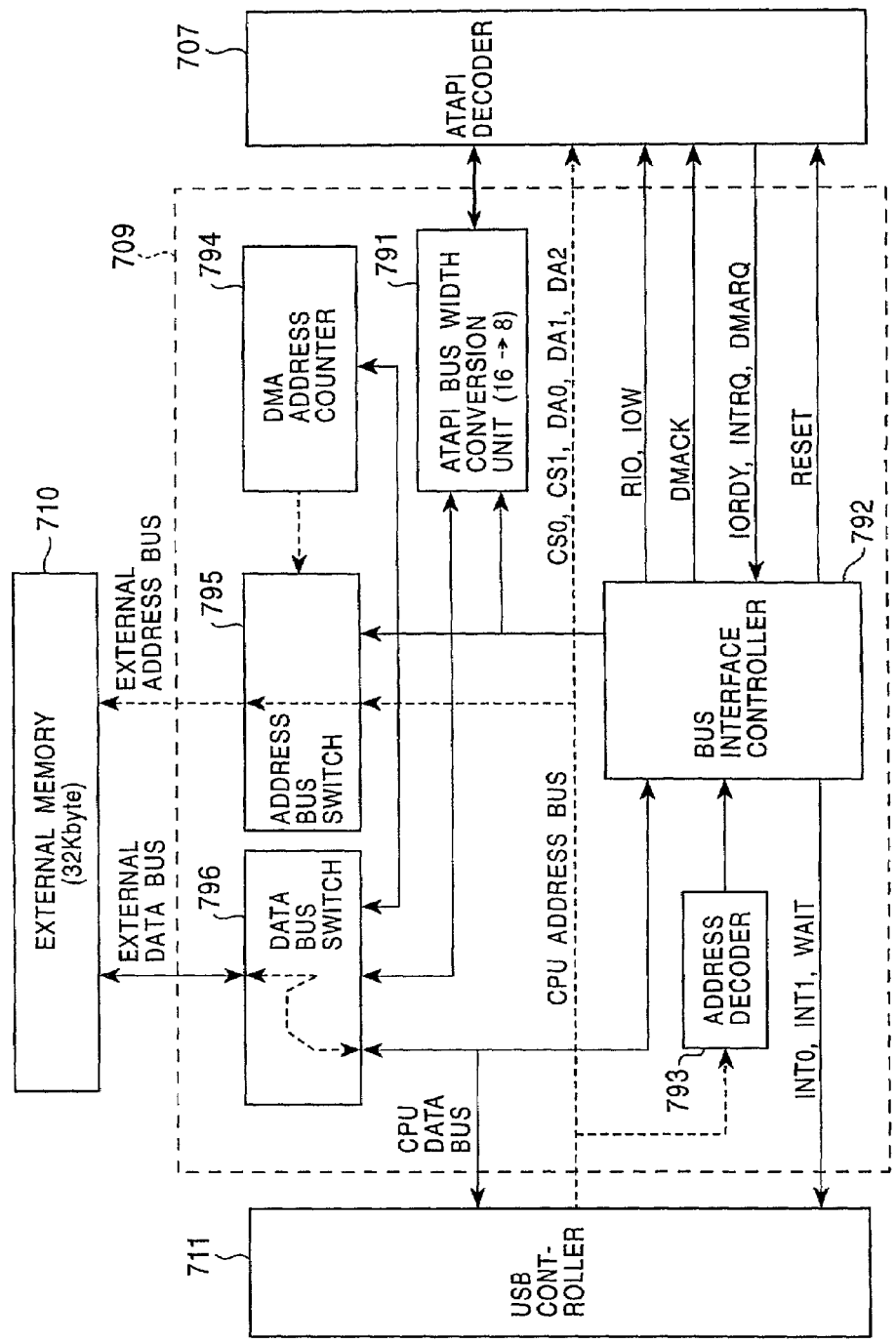
FIG. 16 is an illustration of an operation of the data converter, showing particularly the manner in which data is read by the USB controller from the S-RAM through DMA transmission.

Further, FIG. 16 shows a state of the data converter 709 in which the USB controller 711 reads data from the SRAM 710 with the DMA transfer. In the state of FIG. 16, the data bus switch 796 connects, to the data bus of the USB controller 711, the external data bus which is used for reading and writing data from and in the S-RAM 710, and the address bus switch 795 connects, to the DMA address counter 794, the external address bus which is used for reading and writing data from and in the S-RAM 710.

The USB controller 711 operates in one of the above operating modes changed over selectively so that it receives the output data in the ATAPI format supplied from the address decoder 793 and sends the same to the USB by employing the DMA transfer and the S-RAM 710.

[2-1-4. Operation of Address Latch]

The USB controller 711 realizes the above-described operation by successively reading, interpreting and executing a program stored in the ROM 712. When reading the program as data from the ROM 712, the USB controller 711 employs the address latch 713 as follows.

More specifically, as shown in FIG. 11, the address output ports A0–A7 of the USB controller 711 are directly connected to the address input ports A0–A7 of the ROM 712. Therefore, when the USB controller 711 sends an address of data to be read to the ROM 712, lower-order 8 bits of the address are sent from the address output ports A0–A7 thereof to the address input ports A0–A7 of the ROM 712.

Also, when the USB controller 711 sends the address of the data to be read to the ROM 712, it does not output a strobe signal from the signal output port STB. When the USB controller 711 outputs higher-order 8 bits of the address from the address output ports A8–A15 thereof, the address latch 713 transmits the higher-order 8 bits of the address to the address input ports A8–A15 of the ROM 712 as indicated by a solid line in FIG. 11.

When the USB controller 711 outputs a strobe signal from the signal output port STB after sending the address to the ROM 712 as described above, the address latch 713 holds the higher-order 8 bits of the address which have been so far outputted from to the address output ports A8–A15 of the USB controller 711, and continues outputting the higher-order 8 bits to the address input ports A8–A15 of the ROM 712. It is therefore no longer required for the output ports A8–A15 of the USB controller 711 to output the higher-order 8 bits. Then, the USB controller 711 switches over an internal circuit so that outputting of the higher-order 8 bits from the address output ports A8–A15 is ceased and the address output ports A8–A15 serve as the data input ports D0–D7.

In such a state, data read from the ROM 712 is sent from the data output ports D0–D7 of the ROM 712 to the data input ports D0–D7 of the USB controller 711.

[2-1-5. Destination of Inputted Data]

As described above, data is read from a CD in the CDROM auto-changer 7, and the read data is transmitted to the support ASIC 121 of the main unit 1. The support ASIC 121 serves to make traffic control of information gathered from respective units; namely, it determines what information from which unit is to be sent to which unit. Roughly speaking, the support ASIC 121 sends sound data to the amplifier 22 via the CODEC circuit 122 after processing it in the DSP unit 123, and sends data other than sounds to the CPU module 11. Of the sound data, however, data inputted from the microphone 3 is sent to the CPU module 11 for voice recognition.

The sound data sent to the amplifier 22 includes, e.g., the contents of the radio broadcasting tuned by the tuner 21, the contents of recording read from a music CD in the CD-ROM unit 14 or the CD-ROM auto-changer 7, and voices of a partner sent from the telephone unit 6.

Further, the data other than sounds include, e.g., data indicating which control key is depressed in the face plate unit 15, data in the form of a file, etc. sent from the infrared communication unit 127, digital data sent from the GPS unit 16 and representing the latitude and longitude, the contents of a map and the contents of information in each local area read from a CD-ROM in the CD-ROM unit 14 or the CD-ROM auto-changer 7, data sent from the security control unit 5 and indicating the occurrence of an abnormality, and. data sent from the telephone unit 6 and indicating arrival of a call, the telephone number of a calling party, etc.

[3. Advantages]

With the second embodiment described above, when any of audio data and digital data is read from a recording medium, the read data is converted by the ATAPI decoder 707 into the same protocol format, i.e., the ATAPI format. Therefore, the whole or a part of processing of the audio data and the digital data can be realized with the same procedure and configuration.

Also, since the second embodiment includes the CD-ROM auto-changer 7 of the so-called compatible type reading audio data from a musical CD and digital data from a CD-ROM, the CD-ROM auto-changer 7 can be used to perform both playback of music and digital information processing required in car navigation, etc.

Furthermore, with the second embodiment, the disk playback apparatus produces output data in the ATAPI format. Any of the audio data read from a musical CD and the digital data read from a CD-ROM can be therefore easily processed with the same IDE interface through communication using a command packet similarly to a SCSI.

With the second embodiment, the output data converted from the audio data and the output data converted from the digital data are both outputted by the USB controller 711 in the same interface format adapted for the USB. Accordingly, both the output data can be transmitted through the same serial bus, i.e., the same USB cable.

With the second embodiment, since a plurality of units including the CD-ROM auto-changer 7 are connected one after another through a daisy chain line, an automotive information system having simpler wiring can be easily constructed. Particularly, since a universal serial bus (USB) is employed as the daisy chain line in the second embodiment, a number of various units can be easily connected.

With the second embodiment, the audio data is sent by isochronous transfer, i.e., by data transfer ensuring that a certain amount of data is transferred for a certain period of time, and the digital data is sent by, e.g., bulk transfer including data error correction and data retransmission which ensure high-quality data transfer. With the data transfer using the USB, a plurality of units connected to the daisy chain line can transfer data simultaneously in parallel in accordance with an instruction from a host controller.

With the second embodiment, the data converter 709 serving as control means changes the bit width of data transferred, and controls the DMA transfer. It is therefore possible to achieve increased flexibility of unit combinations and smooth data transfer between the ATAPI decoder 707 and the USB controller 711.

With the second embodiment, since data read from a disk is transferred at a high speed with the operation of the data converter 709 using DMA (direct memory access), even audio data read from a medium having a large amount of data and high sound quality, such as a musical CD, can also be easily processed.

With the second embodiment, the number of bits is converted which is a unit of the output data transferred from the ATAPI decoder 707 to the USB controller 711. Therefore, a decoder and a controller employing different numbers of bits as respective units in processing, e.g., the ATAPI decoder employing 16 bits and the USB controller employing 8 bits, can be used in a combined manner.

With the second embodiment, by the operation of the address latch, a part of the address bus used for accessing the ROM from the controller can serve also as the data bus.

Moreover, with the second embodiment, a computer for controlling the automotive information system includes a universal OS which renders an ability of the computer to develop at a maximum limit by controlling resources such as a CPU and a memory, which provides a standardized and easy-to-use user interface without depending on programs, and which enables functions to be easily added and changed by adding or changing programs in the predetermined format. As a result, the audio data and the digital data read from the disk playback apparatus can be effectively processed with ease.

Additionally, with the second embodiment, regardless of the data type, i.e., whether audio data or digital data is to be processed, any data is transferred in digital form via the USB and then processed. Therefore, the system is less affected by environmental changes and noise, and audio characteristics are stabilized.

[4. Other Embodiments]

The present invention is not limited to the second embodiment described above, but includes other embodiments described below by way of example. While the CD-ROM auto-changer 7 is incorporated in the automotive information system in the above second embodiment, the disk playback apparatus or method of the present invention can also be of course practiced solely.

Further, the disk playback apparatus of the present invention can be employed not only in the automotive information system, but also in a stationary information system. In such a case, an advantage of enabling the entire configuration to be simplified can be obtained likewise. A recording medium may be a MD instead of a CD. The concrete formats and standards, such as ATAPI, USB and PCI bus, are employed by way of illustration only, and they are replaceable with any other suitable formats and standards which can be employed in a similar way.

If a bus having the same bit width as that of a decoder is employed in sending audio data or digital data from a disk playback apparatus, e.g., the CD-ROM auto-changer 7, to a processing unit, e.g., the main unit 1, it is not required for control means, e.g., the data converter 709, to have a function of converting the number of bits. Also, if a part of the address bus is not required to serve also as the data bus when the controller accesses the ROM, the address latch is not needed.

According to the second embodiment, as described above, since audio data read from a disk is outputted in the same format as other digital data, the output data can be transferred and processed with a simpler procedure and configuration.

While the present invention has been described above in connection with the embodiments, it is to be understood that the embodiments are given only by way of illustrative examples, and various modifications and changes can be made without departing from the spirit of the present invention within the scope defined in the attached claims.

What is claimed is:

1. An automotive information system, comprising:
   a main unit having means for detecting a start signal, and means for turning on a power supply to said main unit in response to said start signal; and
   at least one peripheral device connected to said main unit and having means for detecting that a predetermined condition has been satisfied, and means for sending said start signal to said main unit when said predetermined condition has been satisfied, wherein said main unit includes means operative when said power supply is turned on in response to said start signal for the peripheral device, for inquiring from said peripheral device whether said peripheral device has sent the start signal, and wherein said peripheral device has means for answering the inquiry.

2. An automotive information system, comprising:
a main unit having means for detecting a start signal, and means for turning on a power supply to said main unit in response to said start signal; and
at least one peripheral device connected to said main unit and having means for detecting that a predetermined condition has been satisfied, and means for sending said start signal to said main unit when said predetermined condition has been satisfied, wherein said main unit includes means operative when said power supply is turned on in response to said start signal for the peripheral device, for inquiring from said peripheral device whether said peripheral device has sent the start signal, and wherein said peripheral device has means for answering the inquiry;
wherein said main unit and said device are connected by system cable means comprising
a first power line that enables electrical power to be supplied from said main unit to said peripheral device when the power supply to said main unit has been turned on;
a data line for enabling exchange of data between said main part and said peripheral device;
a second power line for enabling backup power to said peripheral device at least when the power supply to said main unit has not been turned on; and
a signal line for transmitting said start signal from said peripheral device to said main unit.

3. An automotive information system comprising a main unit, and a security control unit and a wireless telephone unit that are connected to said main unit,
wherein said security control unit includes:
a sensor for sensing a predetermined extraordinary event; and
means for sending a start signal to said main unit when the sensor senses the predetermined extraordinary event;
wherein said main unit includes:
means for detecting said start signal from the security control device;
means operative to turn on a power supply to said main unit in response to said start signal; and
means for sending, when said power supply is turned on in response to said stan signal received from said security control unit, a notification request signal to said wireless telephone unit to request said wireless telephone unit to send a notification of occurrence of the extraordinary event; and
wherein said wireless telephone unit includes:
means for detecting said notification request signal; and
means for activating the telephone function of said wireless telephone unit in response to said notification request signal to notify a user of the occurrence of the extraordinary event.

4. An automotive system comprising a main unit, a wireless telephone unit connected to said main unit, a speaker, and a microphone;
wherein said wireless telephone unit includes:
means for detecting receipt of a telephone call; and
means for sending a start signal to said main unit upon detection of the receipt of the telephone call;
wherein said main unit includes:
means for detecting said start signal;
means for turning on power supply to said main unit in response to said start signal;
means for informing a user of the receipt of the telephone call when said power supply to said main unit is turned on in response to said stan signal received from said wireless telephone unit;
means for detecting a responding operation of the user for responding to the telephone call; and
means for sending, when said responding operation is detected, connecting instruction to said wireless telephone unit to request said wireless telephone unit to connect the telephone call to said main unit;
said wireless telephone unit further includes:
means for detecting said connecting instruction; and
means responsive to said connecting instruction, for connecting the telephone call to said main unit; and
wherein said main unit further includes means for enabling the user to communicate with the telephone caller by means of said speaker and said microphone.

5. A method of controlling an automotive information system having a main unit and at least one device connected to said main unit, said method comprising the steps of:
enabling said device to detect that a predetermined condition has been satisfied;
causing said device to send a start signal to said main unit when the satisfaction of said predetermined condition is detected;
causing said main unit to detect said start signal: and
enabling said main unit to turn on power supply to said main unit in response to said start signal.

6. A method according to claim 5, further comprising the steps of:
causing, when the power supply is turned on in response to said start signal, said main unit to send an inquiry to said device to inquire whether said device has sent the start signal; and
enabling said device to answer the inquiry.

7. A method of controlling an automotive information system having a main unit, and a security control unit and a wireless telephone unit that are connected to said main unit, said method comprising the steps of:
enabling said security control unit to sense an extraordinary event;
causing, when the extraordinary event is sensed, said security control system to send a start signal to said main unit;
enabling said main unit to detect said start signal;
enabling said main unit to turn on power supply to said main unit in response to said start signal;
causing, when said power supply is turned on in response to said start signal received from said security control unit, said main unit to send a notification request signal to said wireless telephone unit to request said wireless telephone unit to send a notification of occurrence of the extraordinary event;
causing said wireless telephone unit to detect said notification request signal; and
activating a telephone function of said wireless telephone unit in response to said notification request signal to notify a user of the occurrence of the extraordinary event.

8. A method of controlling an automotive system having a main unit, a wireless telephone unit connected to said main unit, a speaker, and a microphone, said method comprising the steps of:
enabling said wireless telephone unit to detect receipt of a telephone call;

causing said wireless telephone unit to send a start signal to said main unit upon detection of the receipt of the telephone call;

enabling said main unit to detect said start signal;

enabling said main unit to turn on power supply to said main unit in response to said start signal;

enabling said main unit to inform a user of the receipt of the telephone call when said power supply to said main unit is turned on in response to said start signal received from said wireless telephone unit;

enabling said main unit to detect a responding operation of the user for responding to the telephone call;

causing said main unit to send connecting instruction to said wireless telephone unit to request said wireless telephone unit to connect the telephone call to said main unit;

causing said wireless telephone unit to detect said connecting instruction; and causing said wireless telephone unit to connect the telephone call to said main unit in response to said connecting instruction; and causing said main unit to enable the user to communicate with the telephone caller by means of said speaker and said microphone.

9. An information processing apparatus, comprising a main unit and at least one device connected to said main unit, wherein said device includes:

means for detecting tat a predetermined condition has been satisfied; and means for sending a start signal to said main unit upon detection of satisfaction of the predetermined condition; and wherein said main unit includes:

means for detecting said start signal;

means for turning on power supply to said main unit in response to said start signal; and means for inquiring, when the power supply is turned on in response to said start signal, said device whether said device has sent said start signal; and wherein said device includes means for answering the inquiry.

10. An automotive information system cable for connecting main unit of an automotive information system and a device included in said automotive information system of claim 9; comprising:

a first power line that enables electrical power to be supplied from said main unit to said device when the power supply to said main unit has been turned on;

a data line for enabling exchange of data between said main part and said device;

a second power line for enabling backup power to said device at least when the power supply to said main unit has not been turned on; and a signal line for transmitting a start signal from said device to said main unit.

11. An electronic device to be connected to a control unit of an automotive information system, comprising:

means for detecting that a predetermined condition has been satisfied;

means for sending a start signal to said control unit upon detection of satisfaction of said predetermined condition; and means for answering an inquiry given by said control unit as to whether said electronic device has sent said start signal.

12. An automotive information system control unit implementing an automotive information system in cooperation with at least one electronic device connected thereto, said automotive information system control unit comprising:

means for detecting a start signal sent from said electronic device;

means for turning on power supply to said main unit upon detection of the start signal; and means for inquiring, when the power supply is turned on in response to said start signal, said electronic device whether said electronic device has sent said start signal.

13. An automotive information system, comprising:

a main unit having means for detecting a start signal, and means for turning on a power supply to said main unit in response to said start signal; and at least one peripheral device connected to said main unit and having means for detecting that a predetermined condition has been satisfied, and means for sending said start signal to said main unit when said predetermined condition has been satisfied, wherein said main unit includes means operative when said power supply is turned on in response to said start signal for the peripheral device, for inquiring from said peripheral device whether said peripheral device has sent the start signal, and wherein said peripheral device has means for answering the inquiry;

wherein said main unit and said peripheral device are connected by system cable means comprising a first power line that enables electrical power to be supplied from said main unit to said peripheral device when the power supply to said main unit has been turned on;

a data line for enabling exchange of data between said main part and said peripheral device;

a second power line for enabling backup power to said peripheral device at least when the power supply to said main unit has not been turned on; and a signal line for transmitting said start signal from said peripheral device to said main unit.

14. An automotive information system, comprising:

a main unit having means for detecting a start signal, and means for turning on a power supply to said main unit in response to said start signal; and at least one peripheral device connected to said main unit and having means for detecting that a predetermined condition has been satisfied, and means for sending said start signal to said main unit when said predetermined condition has been satisfied, wherein said main unit includes means operative when said power supply is turned on in response to said start signal for the peripheral device, for inquiring from said peripheral device whether said peripheral device has sent the start signal, and wherein said peripheral device has means for answering the inquiry;

wherein a plurality of peripheral devices are connected to the main unit and each peripheral device has means for detecting that one or more predetermined conditions have been identified;

means for sending a start signal when one or more predetermined conditions have been satisfied; and means for receiving and responding to an inquiry from the main unit to identify the peripheral device that sent the start signal.

15. An automotive information system, comprising:

a main unit having means for detecting a start signal, and means for turning on a power supply to said main unit in response to said start signal; and at least one peripheral device connected to said main unit and having means for detecting that a predetermined condition has been satisfied, and means for sending said start signal to said main unit when said predetermined condition has been satisfied, wherein said main unit includes means operative when said power supply is turned on in response to said start signal for the peripheral device, for inquiring from said peripheral device whether said peripheral device has sent the start signal, and wherein said peripheral device has means for answering the inquiry;

wherein the main unit includes a user interface face plate that is removably attached wherein removal renders the main unit incapable of directly receiving user inputs.

16. An automotive information system according to claim 2 further including a backup battery power source mounted in the vehicle remote from the plurality of peripheral devices and operatively connected to the plurality of peripheral devices through the second power line.

17. An automotive information system, comprising:
a main unit having means for detecting a start signal, and means for turning on a power supply to said main unit in response to said start signal; and
at least one peripheral device connected to said main unit and having means for detecting that a predetermined condition has been satisfied, and means for sending said start signal to said main unit when said predetermined condition has been satisfied, wherein said main unit includes means operative when said power supply is turned on in response to said start signal for the peripheral device, for inquiring from said peripheral device whether said peripheral device has sent the start signal, and wherein said peripheral device has means for answering the inquiry;
wherein the means for detecting a start signal includes an interrupt control register unit which is prohibited from setting up a search for the start signal.

18. An automotive information system that can connect and power a plurality of peripheral devices mounted to a vehicle, comprising:
a host main unit configured for mounting in the vehicle including:
a host power control unit;
a start signal receiving unit connected to the power control unit;
an inquiring unit;
a host processing unit; and
a host communication unit connected to the inquiring unit, the start signal unit, the host power control unit, and the host processing unit;
a plurality of peripheral devices configured for mounting on the vehicle, each including:
a peripheral power control unit;
a detecting unit;
a start signal transmitting unit connected to the detecting unit,
an answering unit;
a peripheral processing unit; and
a peripheral communication unit connected to the answering unit, the start signal transmitting unit, the peripheral power control unit and the peripheral processing unit; and
a USB cable including:
a first power line to enable electrical power to be supplied from the host power control unit to the plurality of peripheral devices;
a data line for enabling exchange of data between the host main unit and one or more peripheral devices;
a second power line for enabling backup electrical power to be provided to one or more peripheral devices when the host power control unit is turned off;
a signal line for transmitting the start signals from the start signal transmitting units to the start signal receiving units and an inquire signal from the inquiring unit to the answering unit wherein the plurality of peripheral devices, powered by the backup electrical power, can initiate a start of power by the host main unit and the host main unit, when powered up, can respond by inquiring which of the plurality of peripheral devices sent the start signal.

19. An automotive information system according to claim 18 further including a backup battery power source mounted in the vehicle remote from the plurality of peripheral devices and operatively connected to the plurality of peripheral devices through the second power line of the USB cable.

20. An automotive information system according to claim 19 wherein the start signal receiving unit includes an interrupt control register unit which is prohibited from setting a mask which would block the start signal from the plurality of peripheral devices.

* * * * *